(12) United States Patent
Ha et al.

(10) Patent No.: US 12,015,335 B2
(45) Date of Patent: Jun. 18, 2024

(54) ELECTRONIC DEVICE AND MULTI-WIRELESS TRANSMISSION POWER CONTROL METHOD BASED ON STATES OF PLURALITY OF EXTERNAL ELECTRONIC DEVICES

(71) Applicant: Samsung Electronics Co., Ltd., Gyeonggi-do (KR)

(72) Inventors: Mincheol Ha, Gyeonggi-do (KR); Kwangseob Kim, Gyeonggi-do (KR); Kihyun Kim, Gyeonggi-do (KR); Dongzo Kim, Gyeonggi-do (KR); Jiwon Kim, Gyeonggi-do (KR); Jihye Kim, Gyeonggi-do (KR); Yunjeong Noh, Gyeonggi-do (KR); Keumsu Song, Gyeonggi-do (KR); Changhak O, Gyeonggi-do (KR); Kyungmin Lee, Gyeonggi-do (KR); Hyungkoo Chung, Gyeonggi-do (KR); Jongchul Hong, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 17/057,234

(22) PCT Filed: Jul. 2, 2019

(86) PCT No.: PCT/KR2019/008006
§ 371 (c)(1),
(2) Date: Nov. 20, 2020

(87) PCT Pub. No.: WO2020/009402
PCT Pub. Date: Jan. 9, 2020

(65) Prior Publication Data
US 2021/0143683 A1    May 13, 2021

(30) Foreign Application Priority Data
Jul. 3, 2018    (KR) ........................ 10-2018-0077201

(51) Int. Cl.
*H02J 50/80*    (2016.01)
*H02J 7/00*    (2006.01)
(Continued)

(52) U.S. Cl.
CPC ......... *H02M 1/44* (2013.01); *H02J 7/007182* (2020.01); *H02J 50/12* (2016.02);
(Continued)

(58) Field of Classification Search
CPC .. H02J 50/80; H02J 50/12; H02J 50/40; H02J 50/402; H02J 7/007182
(Continued)

(56) References Cited

U.S. PATENT DOCUMENTS 9,397,505 B2    7/2016    Lee et al.
10,505,386 B2    12/2019    Kasar et al.
(Continued)

FOREIGN PATENT DOCUMENTS

| CN | 104218686 A | 12/2014 |
| CN | 106605353 A | 4/2017 |

(Continued)

OTHER PUBLICATIONS

European Search Report dated Mar. 4, 2021.
(Continued)

*Primary Examiner* — Nathaniel R Pelton
(74) *Attorney, Agent, or Firm* — Cha & Reiter, LLC

(57) ABSTRACT

Various embodiments relating to an electronic device are disclosed, and according to an embodiment, the electronic device may comprise: a plurality of coils; a first power generation circuit electrically connected to at least one of the
(Continued)

plurality of coils; a second power generation circuit electrically connected to at least one of the plurality of coils; and a control circuit, wherein when the approach of a second external electronic device is detected while first power is provided to a first external electronic device by using a first frequency via the first power generation circuit, the control circuit allows the frequency of the second power generation circuit to be configured to a second frequency different from a first frequency in order to provide second power to the second external electronic device. Other embodiments may be possible.

9 Claims, 14 Drawing Sheets

(51) Int. Cl.
*H02J 50/12* (2016.01)
*H02J 50/40* (2016.01)
*H02M 1/44* (2007.01)
*H02M 3/335* (2006.01)

(52) U.S. Cl.
CPC ............ *H02J 50/402* (2020.01); *H02J 50/80* (2016.02); *H02M 3/33573* (2021.05)

(58) Field of Classification Search
USPC .......................................................... 320/108
See application file for complete search history.

(56) References Cited

U.S. PATENT DOCUMENTS

| | | | |
|---|---|---|---|
| 10,523,062 B2* | 12/2019 | Bae | H02J 50/12 |
| 11,616,399 B2* | 3/2023 | Kanakasabai | H02J 50/60 320/108 |
| 2014/0091633 A1 | 4/2014 | Walley et al. | |
| 2015/0270738 A1 | 9/2015 | Colja et al. | |
| 2016/0064950 A1 | 3/2016 | Tseng | |
| 2016/0094076 A1 | 3/2016 | Kasar et al. | |
| 2017/0118722 A1 | 4/2017 | Hong et al. | |
| 2018/0301933 A1 | 10/2018 | Lee et al. | |
| 2019/0326769 A1* | 10/2019 | Kanakasabai | H02J 50/10 |
| 2020/0083753 A1* | 3/2020 | Bhat | H01F 38/14 |
| 2020/0274390 A1* | 8/2020 | Bhat | H02J 3/02 |
| 2021/0194284 A1* | 6/2021 | Van Wageningen | H04B 5/0037 |

FOREIGN PATENT DOCUMENTS

| | | | |
|---|---|---|---|
| EP | 3280030 A1 | 2/2018 | |
| KR | 10-2011-0065643 A | 6/2011 | |
| KR | 10-2013-0003965 A | 1/2013 | |
| KR | 10-2014-0060186 A | 5/2014 | |
| KR | 10-2017-0048632 A | 5/2017 | |
| KR | 10-1764546 B1 | 8/2017 | |
| WO | 2014/188713 A1 | 11/2014 | |
| WO | 2017/082531 A1 | 5/2017 | |
| WO | 2018/111416 A1 | 6/2018 | |

OTHER PUBLICATIONS

Examination Report dated Sep. 27, 2022.
Korean Examination Report dated Jan. 17, 2023.
Chinese Office Action dated Sep. 21, 2023.

* cited by examiner

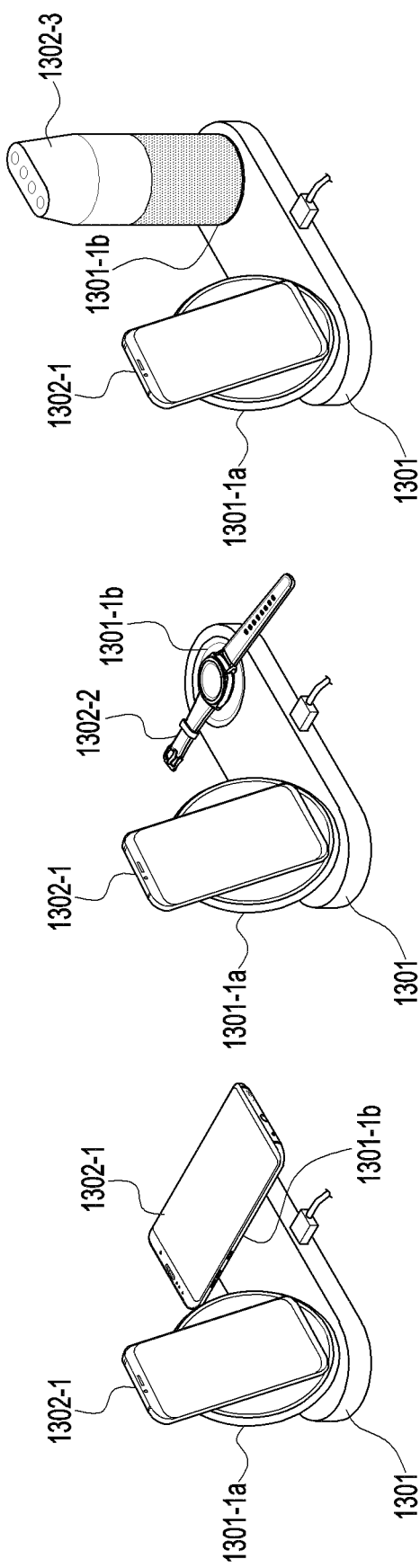

ELECTRONIC DEVICE AND MULTI-WIRELESS TRANSMISSION POWER CONTROL METHOD BASED ON STATES OF PLURALITY OF EXTERNAL ELECTRONIC DEVICES

CROSS-REFERENCE TO RELATED APPLICATION

This application is a National Phase Entry of PCT International Application No. PCT/KR2019/008006, which was filed on Jul. 2, 2019 and claims priority to Korean Patent Application No. 10-2018-0077201, which was filed on Jul. 3, 2018 in the Korean Intellectual Property Office, the contents of which are incorporated herein by reference.

BACKGROUND

1. Field

Various embodiments relate to an electronic device and method for wirelessly transmitting power.

2. Description of the Related Art

With development of a wireless power transmission technology, many electronic devices have recently used the wireless power transmission technology for wireless charging or contactless charging. The wireless power transmission technology (wireless power transfer) is a technology which converts electrical energy into an electromagnetic wave having a frequency and wirelessly transfers energy to a load without a transmission line. The wireless power transmission technology may be a technology in which power is wirelessly transferred from a power transmission device to a power reception device without a connection between the power reception device and the power transmission device via a separate connector, thereby a battery of the power reception device is charged. The wireless power transmission technology may include a magnetic induction scheme and a magnetic resonance scheme, and there may be various types of wireless power transmission technologies.

A magnetic induction scheme-wireless power transmission system is a scheme of transferring power by using a magnetic field induced in a coil, and is also a technology which provides a load with energy by flowing an induced current via a reception coil by using a magnetic field generated from a current flowing via a transmission coil. Typical standards of the magnetic induction scheme include wireless power consortium (WPC), power matters alliance (PMA), and/or the like, and a designated frequency band such as 110 to 205 kHz for WPC, and 227 to 357 kHz, and 118 to 153 kHz for PMA may be used as a frequency used for power transmission.

A magnetic resonance scheme-wireless power transmission system is a technology which transmits and receives power by using a resonance phenomenon between two coils having the same resonance frequency, typical standards of the magnetic resonance scheme include alliance for wireless power (A4WP), and a designated resonance frequency such as 6.78 MHz may be used in the magnetic resonance scheme-wireless power transmission system.

SUMMARY

In a wireless power transmission system, a single wireless power transmission device (e.g., an electronic device) may provide a single wireless power reception device (e.g., an external electronic device) with power without a physical connection, and the single wireless power transmission device may provide each of a plurality of wireless power reception devices (e.g., a first external electronic device and a second external electronic device) with power.

A wireless power transmission device may transmit a wireless power signal by using a frequency to provide wireless power. For example, if a single wireless power transmission device such as a multi-wireless charger, or a multi-wireless charging pad, and/or the like uses the same frequency band or an adjacent frequency band for simultaneously providing a plurality of wireless power reception devices with power, interference among wireless power transmission signals provided to each of the plurality of wireless power reception devices may occur. Due to occurrence of the interference, a phase of each of the wireless power transmission signals may change, electric field strength, e.g., H-Field Strength of each of the wireless power transmission signals may increase, and electromagnetic interference (EMI), radiated emission (RE), or conducted emission (CE) may occur. Due to the H-Field Strength, EMI, RE, or CE, the power transmission device and the plurality of wireless power reception devices may cause a failure.

Various embodiments may provide an electronic device for preventing occurrence of H-Field Strength, EMI, RE, or CE by providing a plurality of external electronic devices with power by using different frequency bands or non-adjacent frequency bands, and a multi-wireless transmission power control method which is based on states of a plurality of external electronic devices.

An electronic device according to various embodiments may include a plurality of coils, a first power generation circuit electrically connected to at least one of the plurality of coils, a second power generation circuit electrically connected to at least one of the plurality of coils, and a control circuit, and the control circuit may control to when approach of a second external electronic device is detected while first power is provided to a first external electronic device by using a first frequency via the first power generation circuit, and to set a frequency of the second power generation circuit to a second frequency different from the first frequency for providing the second external electronic device with second power.

An electronic device according to various embodiments may include a plurality of coils, a first power generation circuit electrically connected to at least one of the plurality of coils, a second power generation circuit electrically connected to at least one of the plurality of coils, and a control circuit, and the control circuit may control the first power generation circuit to generate a first signal for providing a first external electronic device with first power, and control the second power generation circuit to generate a second signal for providing a second external electronic device with second power.

According to various embodiments, in a case that an electronic device provides a plurality of external electronic devices with power, the electronic device provides the plurality of external electronic devices with the power by using different frequencies, so occurrence of H-Field Strength, EMI, RE, or CE in which a wireless power transmission signal provided to one external electronic device affects another external electronic device may be prevented.

According to various embodiments, if a second external electronic device approaches an electronic device while the electronic device provides a first external electronic device with first power by using a first frequency, the electronic device provides the second external electronic device with second power by using a second frequency different from the first frequency, so interference between a first power signal provided to the first external electronic device and a second power signal provided to the second external electronic device may be prevented.

According to various embodiments, an electronic device changes a first frequency and a second frequency based on charging states of a first external electronic device and a second external electronic device while providing the first external electronic device with first power by using the first frequency and providing the second external electronic device with second power by using the second frequency, thereby the electronic device may adjust magnitudes of the first power and the second power which are provided to the first external electronic device and the second external electronic device, respectively based on the charging states of the first external electronic device and the second external electronic device.

According to various embodiments, if first power provided to a first external electronic device is greater than second power provided to a second external electronic device, an electronic device sets a first frequency for providing the first power to a frequency which is lower than a second frequency for providing the second power, thereby the first external electronic device which requires high power transmission may use a low frequency, so power transmission efficiency may be increased.

BRIEF DESCRIPTION OF THE DRAWINGS

FIGS. 13*a* to 13*c* are diagrams illustrating an example in which a plurality of external electronic devices are mounted or placed on an electronic device according to various embodiments.

DETAILED DESCRIPTION

Figure 1:
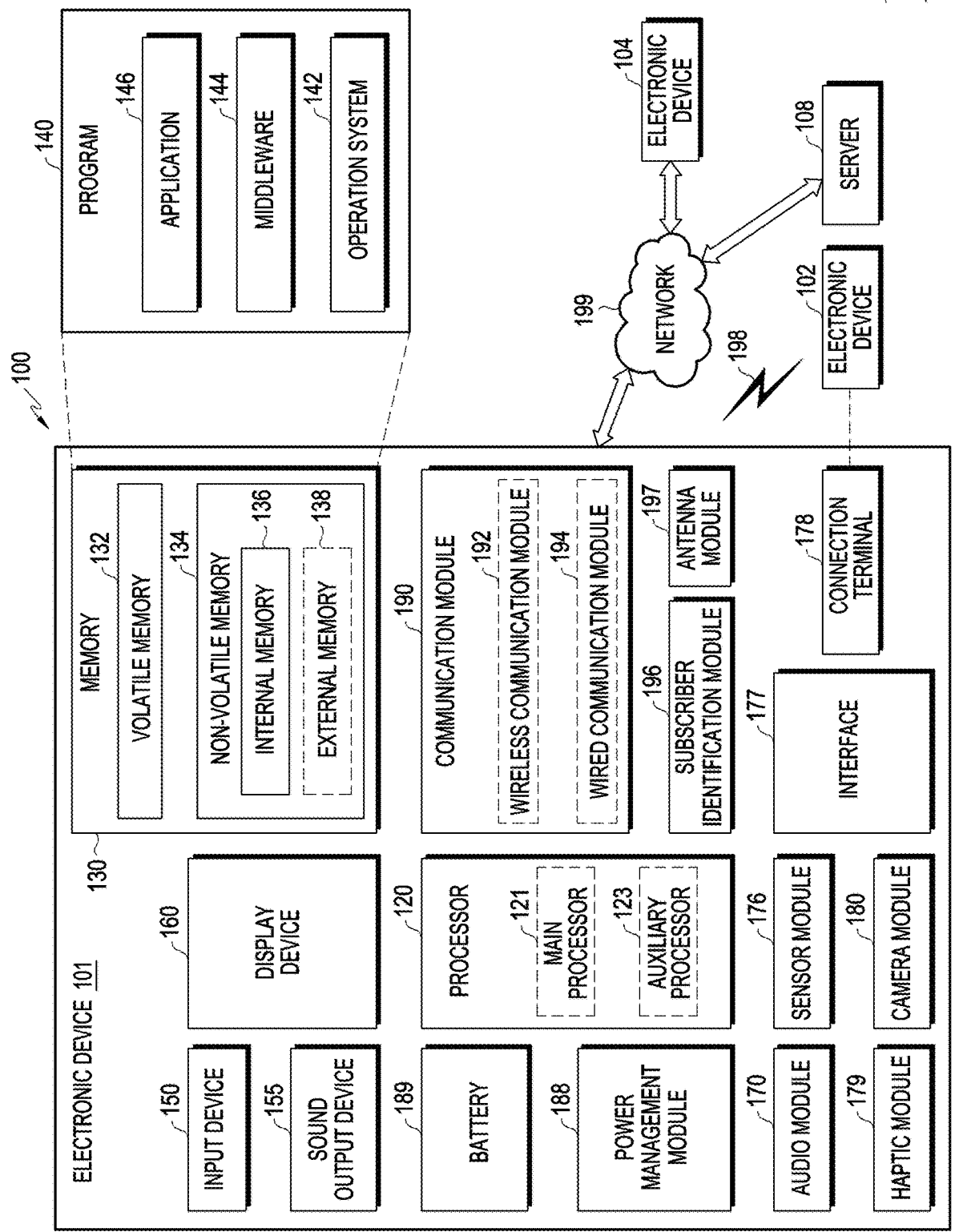
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

According to various embodiments, power and signals may be transmitted and received between the electronic device 101 and the external electronic device 102 by using the first network 198. According to an embodiment, the electronic device 101 may wirelessly receive power from the external electronic device 102.

The communication module 190 may transmit and receive power information or a control signal for receiving power to and from the external electronic device 102. The power information may include at least one of a remaining amount of a battery of the electronic device 101, a number of times of charging, a usage amount, a battery capacity, or a battery ratio. The communication module 190 of the electronic device 101 may transmit a charging function control signal for controlling the charging function of the electronic device 101. The charging function control signal may be a control signal for enabling or disabling the charging function of the electronic device 101. Alternatively, the charging function control signal may include information related to a power adjustment or power control command to respond to occurrence of an abnormal situation according to various embodiments.

The antenna module 197 may transmit or receive a signal or power to or from the outside (e.g., the external electronic device) of the electronic device 101. According to an embodiment, the antenna module 197 may include one or more antennas, and at least one antenna appropriate for a communication scheme used in the communication network, such as the first network 198 or the second network 199, may be selected, for example, by the communication module 190 (e.g., the wireless communication module 192) from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
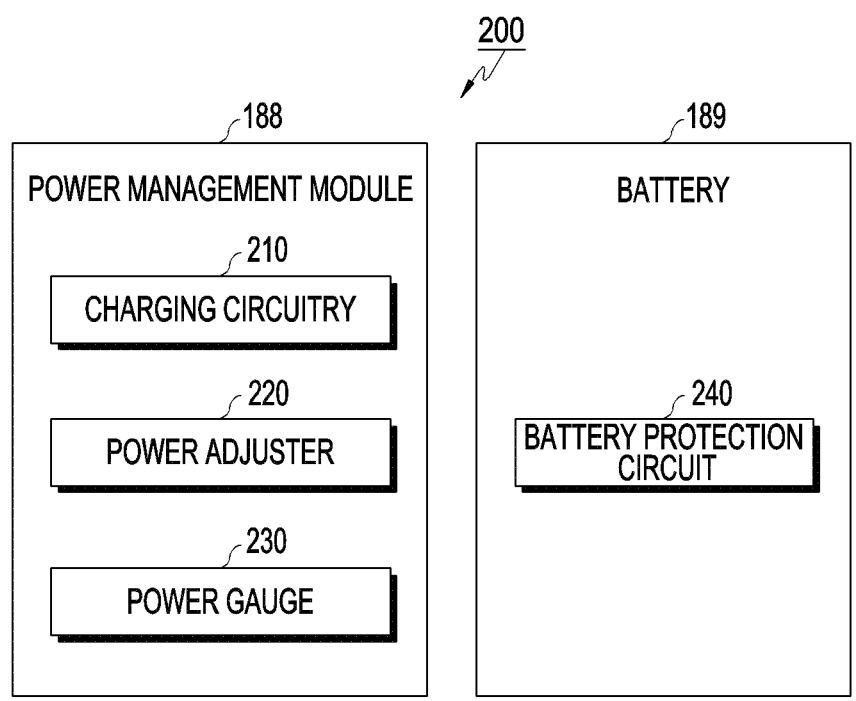
FIG. 2 is a block diagram illustrating a power management module and a battery according to various embodiments.

FIG. 2 is a block diagram 200 illustrating the power management module 188 and the battery 189 according to various embodiments.

Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197. For example, the charging circuitry 210 may charge the battery 189 by using power which is wirelessly provided from an external electronic device 102.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a battery protection circuit (protection circuit module (PCM)) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

According to various embodiments, the external electronic device 102 may include the same components as the electronic device 101, and may wirelessly provide the electronic device 101 with power.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
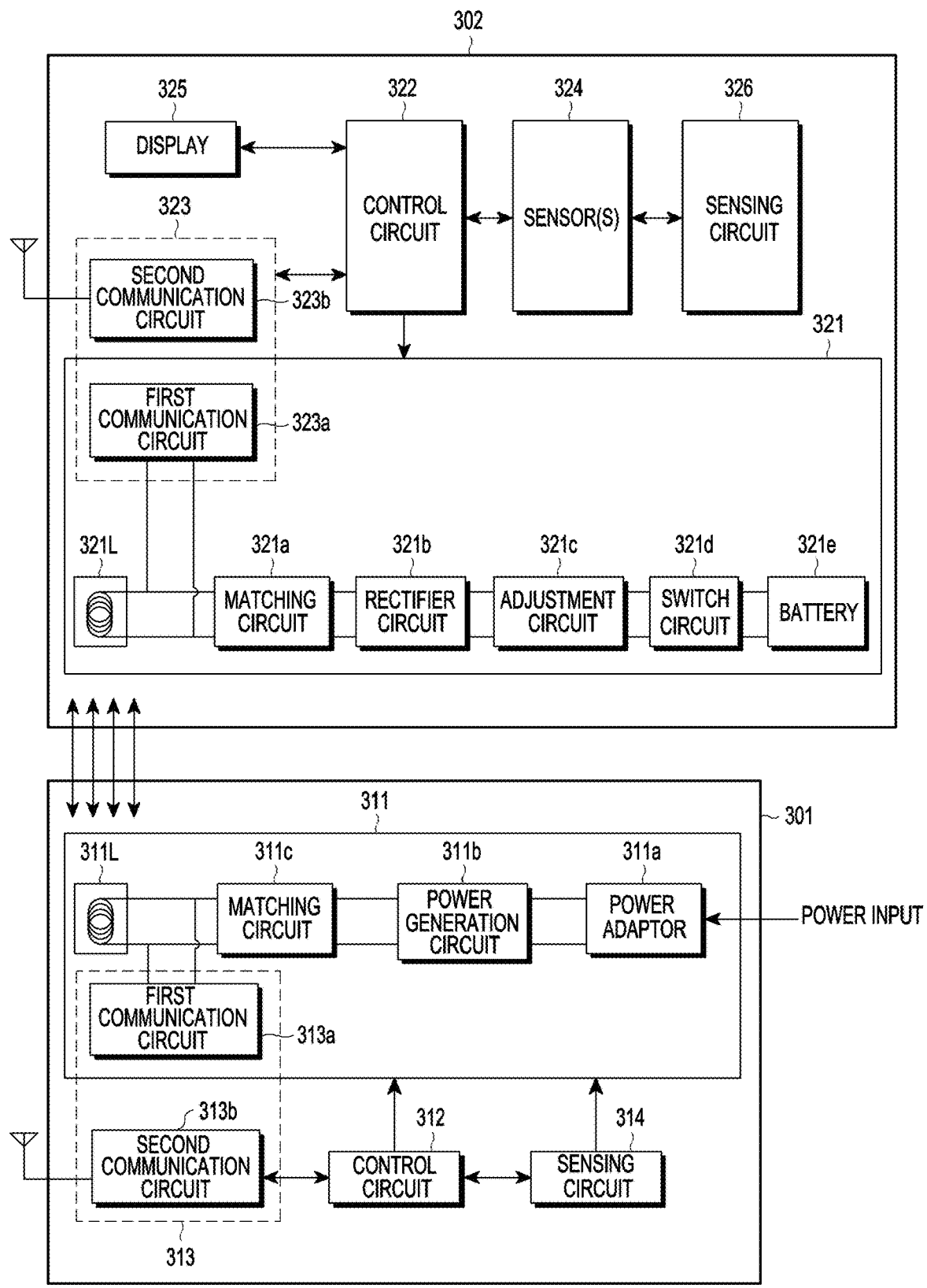
FIG. 3 is a diagram illustrating a wireless charging environment according to various embodiments.

FIG. 3 is a diagram illustrating a wireless charging environment according to various embodiments.

Referring to FIG. 3, an electronic device 301 (e.g., 102 in FIG. 1) (hereinafter, referred to as 'a power transmission device') according to various embodiments may wirelessly provide an external electronic device 302 (e.g., 101 in FIG. 1) (hereinafter, referred to as 'a power reception device') with power, and the external electronic device 302 may wirelessly receive the power.

According to various embodiments, the power transmission device 301 may include a power transmission circuit 311, a control circuit 312, a communication circuit 313, and/or a sensing circuit 314.

According to various embodiments, the power transmission circuit 311 may include a power adaptor 311*a* which inputs a power source (or power) from external and properly converts a voltage of the inputted power source, a power generation circuit 311*b* which generates power, and/or a matching circuit 311*c* which maximizes efficiency between a transmission coil 311L and a reception coil 321L.

According to various embodiments, the power transmission circuit 311 may include a plurality of at least some of the power adapter 311*a*, the power generation circuit 311*b*, the transmission coil 311L, or the matching circuit 311*c* so that power may be transmitted to a plurality of power reception devices (e.g., a first external electronic device and a second external electronic device).

According to various embodiments, the power transmission circuit 311 may generate a first signal of a first frequency for providing the first external electronic device with first power and a second signal of a second frequency for providing the second external electronic device with second power by using the power generation circuit 311b.

According to various embodiments, the control circuit 312 may perform overall control for the power transmission device 301, generate various messages required for wireless power transmission, and transfer the various messages to the communication circuit 313. In an embodiment, the control circuit 312 may calculate power (or amount of power) to be transmitted to the power reception device 302 based on information received from the communication circuit 313. In an embodiment, the control circuit 312 may control the power transmission circuit 311 so that power calculated by the transmission coil 311L is transmitted to the power reception device 302.

According to various embodiments, if the control circuit 312 transmits power to each of a plurality of power reception devices (e.g., the first external electronic device and the second external electronic device), the control circuit 312 may control the power generation circuit 311b to generate the first signal of the first frequency for providing the first external electronic device with the first power and the second signal of the second frequency for providing the second external electronic device with the second power.

According to various embodiments, the communication circuit 313 may include at least one of a first communication circuit 313a and a second communication circuit 313b. The first communication circuit 313a may communicate with a first communication circuit 323a of the power reception device 302 by using, for example, the same frequency as a frequency used for power transfer in the transmission coil 311L (e.g., an inband scheme). In an embodiment, the second communication circuit 313b may communicate with a second communication circuit 323b of the power reception device 302 by using, for example, a frequency which is different from the frequency used for power transfer in the transmission coil 311L (e.g., an outband scheme). For example, the second communication circuit 313b may obtain information (Vrec information, Iout information, various packets, messages, etc.) related to a charging state from the second communication circuit 323b by using one of various short-range communication schemes such as Bluetooth, BLE, WI-Fi, and NFC.

According to various embodiments, the sensing circuit 314 may include at least one sensor, and may sense at least one state of the power transmission device 302 by using the at least one sensor.

According to various embodiments, the sensing circuit 314 may include at least one of a temperature sensor, a motion sensor, or a current (or voltage) sensor, sense a temperature state of the power transmission device 301 by using the temperature sensor, sense a motion state of the power transmission device 301 by using the motion sensor, and sense a state, e.g., a current magnitude, a voltage magnitude, or a power magnitude of an output signal of the power transmission device 301 by using the current (or voltage) sensor.

According to an embodiment, the current (or voltage) sensor may measure a signal in the power transmission circuit 311. A signal may be measured in at least part of the coil 311L, the matching circuit 311c, or the power generation circuit 311b. For example, the current sensor (or voltage sensor) may include a circuit measuring a signal at a front end of the coil 311L.

According to various embodiments, the sensing circuit 314 may be a circuit for foreign object detection (FOD).

According to various embodiments, the power reception device 302 (e.g., 101 in FIG. 1) may include a power reception circuit 321 (e.g., a power management module 188), a control circuit 322 (e.g., a processor 120), a communication circuit 323 (e.g., a communication module 190), at least one sensor 324 (e.g., a sensor module 176), a display 325 (e.g., a display device 160), and a sensing circuit 326. For the power reception device 302, a description of a structure corresponding to the power transmission device 301 may be partially omitted.

According to various embodiments, the power reception circuit 321 may include a reception coil 321L for wirelessly receiving power from the power transmission device 301, a matching circuit 321a, a rectifier circuit 321b for rectifying received AC power to DC, an adjustment circuit 321c for adjusting a charging voltage, a switch circuit 321d, and/or a battery 321e (e.g., a battery 189).

According to various embodiments, the control circuit 322 may perform overall control for the power reception device 302, generate various messages required for wireless power transmission, and transfer the various messages to the communication circuit 323.

According to various embodiments, the communication circuit 323 may include at least one of the first communication circuit 323a and the second communication circuit 323b. The first communication circuit 323a may communicate with the power transmission device 301 via the reception coil 321L. The second communication circuit 323b may communicate with the power transmission device 301 by using one of various short-range communication schemes such as Bluetooth, BLE, WI-Fi, and NFC.

According to various embodiments, the at least one sensor 324 may include at least some of a current/voltage sensor, a temperature sensor, an illuminance sensor, or a sound sensor.

According to various embodiments, the display 325 may display various display information required for wireless power transmission and reception.

According to various embodiments, the sensing circuit 326 may sense the power transmission device 301 by sensing a search signal or power received from the power transmission device 301. The sensing circuit 326 may sense a change in signals at an input/output terminal of the coil 321L, or the matching circuit 321a, or the rectifier circuit 321b by a coil 321L signal generated by a signal outputted from the power transmission device 301. According to various embodiments, the sensing circuit 326 may be included in a receiving circuit 351.

Figure 4:
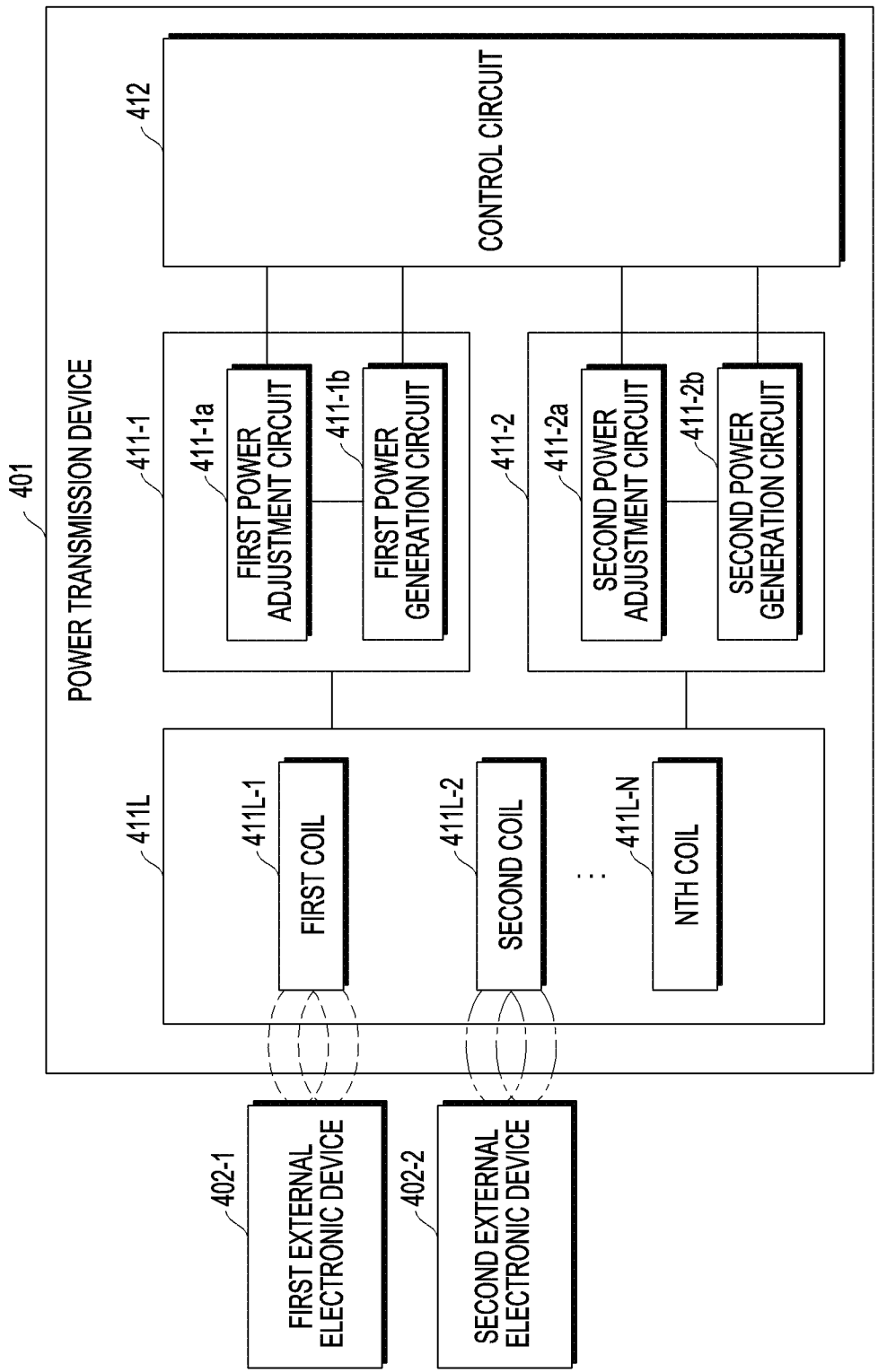
FIG. 4 is a diagram illustrating an electronic device capable of transmitting power to a plurality of external electronic devices according to various embodiments.

FIG. 4 is a diagram illustrating an electronic device capable of transmitting power to a plurality of external electronic devices according to various embodiments.

Referring to FIG. 4, an electronic device 401 (e.g., an electronic device 102 in FIG. 1 or a power transmission device 301 in FIG. 3, hereinafter, also referred to as 'a power transmission device') according to various embodiments may wirelessly transmit power to each of a first external electronic device 402-1 (e.g., an electronic device 101 in FIG. 1 or a power reception device 302 in FIG. 3, hereinafter, also referred to as 'a first power reception device') and a second external electronic device 402-2 (e.g., the electronic device 101 in FIG. 1 or the power reception device 302 in FIG. 3, hereinafter, also referred to as 'a second power reception device'), and the first external electronic device 402-1 and the second external electronic device 402-2 may wirelessly receive the power.

According to various embodiments, the electronic device 401 may include a plurality of coils 411L (e.g., a transmission coil 311L in FIG. 3), a first power transmission circuit 411-1 (e.g., a power transmission circuit 311 in FIG. 3), a second power transmission circuit 411-2 (e.g., the power transmission circuit 311 in FIG. 3), and/or a control circuit 412 (e.g., a control circuit 312 in FIG. 3).

According to various embodiments, the plurality of coils 411L (e.g., the transmission coil 311L in FIG. 3) may include at least two transmission coils (or antennas). According to an embodiment, the plurality of coils 411L may include a first transmission coil 411L-1 and a second transmission coil 411L-1, or may include N coils such as the first transmission coil 411L-1 to an Nth transmission coil 411L-N.

According to various embodiments, the first power transmission circuit 411-1 may include a first power adjustment circuit 411-1a and/or a first power generation circuit 411-1b.

According to various embodiments, the first power adjustment circuit 411-1a may provide the first power generation circuit 411-1b with a first voltage (power source or power). According to an embodiment, the first power adjustment circuit 411-1a may vary the first voltage (power source or power) provided to the first power generation circuit 411-1b.

According to various embodiments, the first power generation circuit 411-1b may generate a first signal of a designated frequency (hereinafter, also referred to as 'a first frequency') for providing the first power by using the first voltage (power source or power) provided from the first power adjustment circuit 411-1a. For example, the designated frequency may be a designated frequency band, and the first frequency may be a first frequency band.

According to an embodiment, the first power generation circuit 411-1b may include an inverter (e.g., a bridge circuit) including a plurality of switches, and may generate the first signal of the first frequency for providing the first power via an on or off operation of each of the plurality of switches. According to an embodiment, the first power generation circuit 411-1b may change the first frequency to another frequency (e.g., a second frequency) by controlling the on or off operation of each of the plurality of switches.

According to various embodiments, a switch (not shown) may be further included between the first power generation circuit 411-1b and the plurality of coils 411L, and at least one of the plurality of coils 411L may be connected to the first power generation circuit 411-1b via the switch. According to various embodiments, the first signal generated from the first power generation circuit 411-1b may be radiated in a form of an electromagnetic wave via a transmission coil (e.g., the first transmission coil 411L-1 or at least one of the first transmission coil 411-L to the Nth transmission coil 411L-N) connected to the first power generation circuit 411-1b among the plurality of coils 411L.

According to various embodiments, the second power transmission circuit 411-2 may include a second power adjustment circuit 411-2a and/or a second power generation circuit 411-2b.

According to various embodiments, the second power adjustment circuit 411-2a may provide the second power generation circuit 411-2b with a second voltage (power source or power). According to an embodiment, the second power adjustment circuit 411-2a may vary the second voltage (power source or power) provided to the second power generation circuit 411-2b.

According to various embodiments, the second power generation circuit 411-2b may generate a second signal of a designated frequency (hereinafter, also referred to as 'a second frequency') for providing second power by using a second voltage (power source or power) provided from the second power adjustment circuit 411-2a. According to an embodiment, the second power generation circuit 411-2b may include an inverter (e.g., a bridge circuit) including a plurality of switches, and may generate the second signal of the second frequency for providing the second power via an on or off operation of each of the plurality of switches. According to an embodiment, the second power generation circuit 411-2b may change the second frequency to another frequency by controlling the on or off operation of each of the plurality of switches.

According to various embodiments, a switch (not shown) may be further included between the second power generation circuit 411-2b and the plurality of coils 411L, and at least one of the plurality of coils 411L may be connected to the second power generation circuit 411-2b via the switch. According to various embodiments, the second signal generated from the second power generation circuit 411-2b may be radiated in a form of an electromagnetic wave via a transmission coil (e.g., the second transmission coil 411L-2 or at least one of the first transmission coil 411-L to the Nth transmission coil 411L-N) connected to the second power generation circuit 411-2b among the plurality of coils 411L.

According to various embodiments, the control circuit 412 (e.g., the control circuit 312 in FIG. 3) may control the first power generation circuit 411-1b to generate the first signal of the first frequency for providing the first external electronic device 402-1 with the first power, and control the second power generation circuit 411-2b to generate the second signal of the second frequency for providing the second external electronic device 402-2 with the second power.

According to an embodiment, if it is required to transmit power to the first external electronic device 402-1 for wireless charging via the first transmission coil 411L-1, the control circuit 412 may control the first power adjustment circuit 411-1a to provide the first power generation circuit 411-1b with a first voltage (Vdc1), control the first power generation circuit 411-1b to generate a first signal of the first frequency (e.g., 110 kHz), and control the generated first signal of the first frequency to be transferred to the first external electronic device 402-1 via the first transmission coil 411L-1.

According to an embodiment, if it is required to transmit power to the second external electronic device 402-2 for wireless charging via the second transmission coil 411L-2, the control circuit 412 may control the second power adjustment circuit 411-2a to provide the second power generation circuit 411-2b with a second voltage (Vdc2), control the second power generation circuit 411-2b to generate a second signal of the second frequency (e.g., 120 kHz), and control the generated second signal of the second frequency to be transferred to the second external electronic device 402-2 via the second transmission coil 411L-2.

According to various embodiments, if an electronic device is adjacent to one external electronic device in a default state (a state in which power is not transmitted) and transmits power to the external electronic device, the electronic device may set a transmission frequency of each of the first power transmission circuit 411-1 or the second power transmission circuit 411-1 to a first frequency (e.g., 110 kHz). According to various embodiments, if each of a plurality of external electronic devices (e.g., the first external electronic device 402-1 and the second external electronic device 402-2) requests power transmission from the control circuit 412 while the control circuit 412 is in a default state (a state in which power is not transmitted), the control circuit 412 may change a frequency of one of the first power generation circuit 411-1b or the second power generation circuit 411-2b to a second frequency (e.g., 120 kHz) different from the first frequency (e.g., 110 kHz), and change a first voltage (Vdc1) to a second voltage (Vdc2). The second voltage (Vdc2) may be a voltage capable of compensating for a difference between first power provided via the first frequency (e.g., 110 kHz) and second power provided by using the second frequency (e.g., 120 kHz).

According to various embodiments, if the control circuit 412 senses approach of the second external electronic device 402-2 while providing the first external electronic device 402-1 with the first power by using the first signal of the first frequency (e.g., 110 kHz) by using the first power generation circuit 411-1b, the control circuit 412 may control to set a frequency of the second power generation circuit 411-2b to the second frequency (e.g., 120 kHz) different from the first frequency (e.g., 110 kHz), and control to set a voltage provided to the second power generation circuit 411-2b to the second voltage (Vdc2) which corresponds to the second frequency. According to an embodiment, the control circuit 412 may receive an approach sensing signal from a sensing means (e.g., a coil, and/or the like) which senses the approach of the second external electronic device 402-2.

According to various embodiments, if the control circuit 412 senses approach of the second external electronic device 402-2 while providing the first external electronic device 402-1 with the first power by using the first signal of the first frequency (e.g., 110 kHz) by using the first power generation circuit 411-1b, the control circuit 412 may control to set a frequency of the first power generation circuit 411-1b to the second frequency (e.g., 120 kHz) different from the first frequency (e.g., 110 kHz), and control to set a voltage provided to the first power generation circuit 411-1b to the second voltage (Vdc2) which corresponds to the second frequency.

According to various embodiments, while providing the first external electronic device 402-1 with the first power by using the first signal of the first frequency (e.g., 110 kHz) and providing the second external electronic device 402-2 with the second power by using the second signal of the second frequency, the control circuit 412 may control each of the first frequency (e.g., 110 kHz) and the second frequency (e.g., 120 kHz) to be changed based on charging states of the first external electronic device 402-1 and the second external electronic device 402-2.

According to an embodiment, if charging power charged in the first external electronic device 402-1 is lower than charging power charged in the second external electronic device 402-2 (for example, if the first external electronic device 402-1 is fully charged and the charging power charged in the first external electronic device 402-1 is lower than the charging power charged in the second external electronic device 402-2) while the control circuit 412 provides the first external electronic device 402-1 with the first power by using the first signal of the first frequency (e.g., 110 kHz) and provides the second external electronic device 402-2 with the second power by using the second signal of the second frequency, the control circuit 412 may change the first frequency (e.g., 110 kHz) and the first voltage (Vdc1) of the first signal to another frequency and another voltage, respectively, to provide the external electronic device 402-1 with power less than the first power, and change the second frequency (e.g., 120 kHz) and the second voltage (Vdc2) of the second signal to another frequency and another voltage so that the changed frequency and the other frequency of the first signal may be used and the second power may be provided. For example, the first frequency (e.g., 110 kHz) and the first voltage (Vdc1) of the first signal may be changed to the second frequency (e.g., 120 kHz) and a voltage which is equal to or lower than the first voltage, respectively, and the second frequency (e.g., 120 kHz) and the second voltage (Vdc2) of the second signal may be changed to the first frequency (e.g., 110 kHz) and the first voltage (Vdc1), respectively.

According to various embodiments, if one device (e.g., the first external electronic device 402-1) among the first external electronic device 402-1 and the second external electronic device 402-2 requires high power transmission, the control circuit 412 may configure a power transmission circuit (e.g., the first power transmission circuit 411-1) for providing the first external electronic device 402-1 with high power among the first power transmission circuit 411-1 and the second power transmission circuit 411-2 to generate a first signal of the first frequency (e.g. 110 kHz) for the high power transmission, and configure another power transmission circuit (e.g., the second power transmission circuit 411-2) to generate a second signal of the second frequency (e.g., 120 kHz). The first signal of the first frequency may be a signal capable of providing higher power than the second signal of the second frequency.

According to various embodiments, if a device (e.g., a third external electronic device) other than the first external electronic device 402-1 and the second external electronic device 402-2 requests transmission, the control circuit 412 may be configured to generate a third signal of a third frequency via a third power transmission circuit. For example, the third signal of the third frequency may provide power without interference with the first signal of the first frequency or the second signal of the second frequency and may be generated by using the third signal and a third voltage (vdc3). For example, the third frequency may be different from the first and second frequencies, and the third voltage (Vdc3) may be different from the first voltage (Vdc1) and the second voltage (Vdc2).

According to various embodiments, an electronic device (e.g., 102 in FIG. 1, 301 in FIG. 3, or 401 in FIG. 4) provides a plurality of external electronic devices (e.g., 101 in FIG. 1, 302 in FIG. 3, or 402-1 and 402-2 in FIG. 4) with power by using different frequencies or non-adjacent frequencies, thereby occurrence of H-Field Strength, EMI, RE, or CE may be prevented.

According to various embodiments, if a second external electronic device (e.g., 402-2 in FIG. 4) approaches an electronic device (e.g., 102 in FIG. 1, 301 in FIG. 3, or 401 in FIG. 4) while the electronic device provides a first external electronic device (e.g., 402-1 in FIG. 4) with first power by using a first frequency, the electronic device provides the second external electronic device with second power by using a second frequency different from the first frequency, so interference between a first power signal provided to the first external electronic device and a second power signal provided to the second external electronic device may be prevented.

According to various embodiments, an electronic device (e.g., 102 in FIG. 1, 301 in FIG. 3, or 401 in FIG. 4) changes a first frequency and a second frequency based on charging states of a first external electronic device (e.g., 402-1 in FIG. 4) and a second external electronic device (e.g., 402-2 in FIG. 4) while providing the first external electronic device with first power by using the first frequency and providing the second external electronic device with second power by using the second frequency, thereby the electronic device may adjust magnitudes of the first power and the second power which are provided to the first external electronic device and the second external electronic device, respectively based on the charging states of the first external electronic device and the second external electronic device.

According to various embodiments, if first power provided to a first external electronic device (e.g., 402-1 in FIG. 4) is greater than second power provided to a second external electronic device (e.g., 402-2 in FIG. 4), an electronic device (e.g., 102 in FIG. 1, 301 in FIG. 3, or 401 in FIG. 4) sets a first frequency for providing the first power to a frequency which is lower than a second frequency for providing the second power, thereby the first external electronic device which requires high power transmission may use a low frequency, so power transmission efficiency may be increased.

Figure 5:
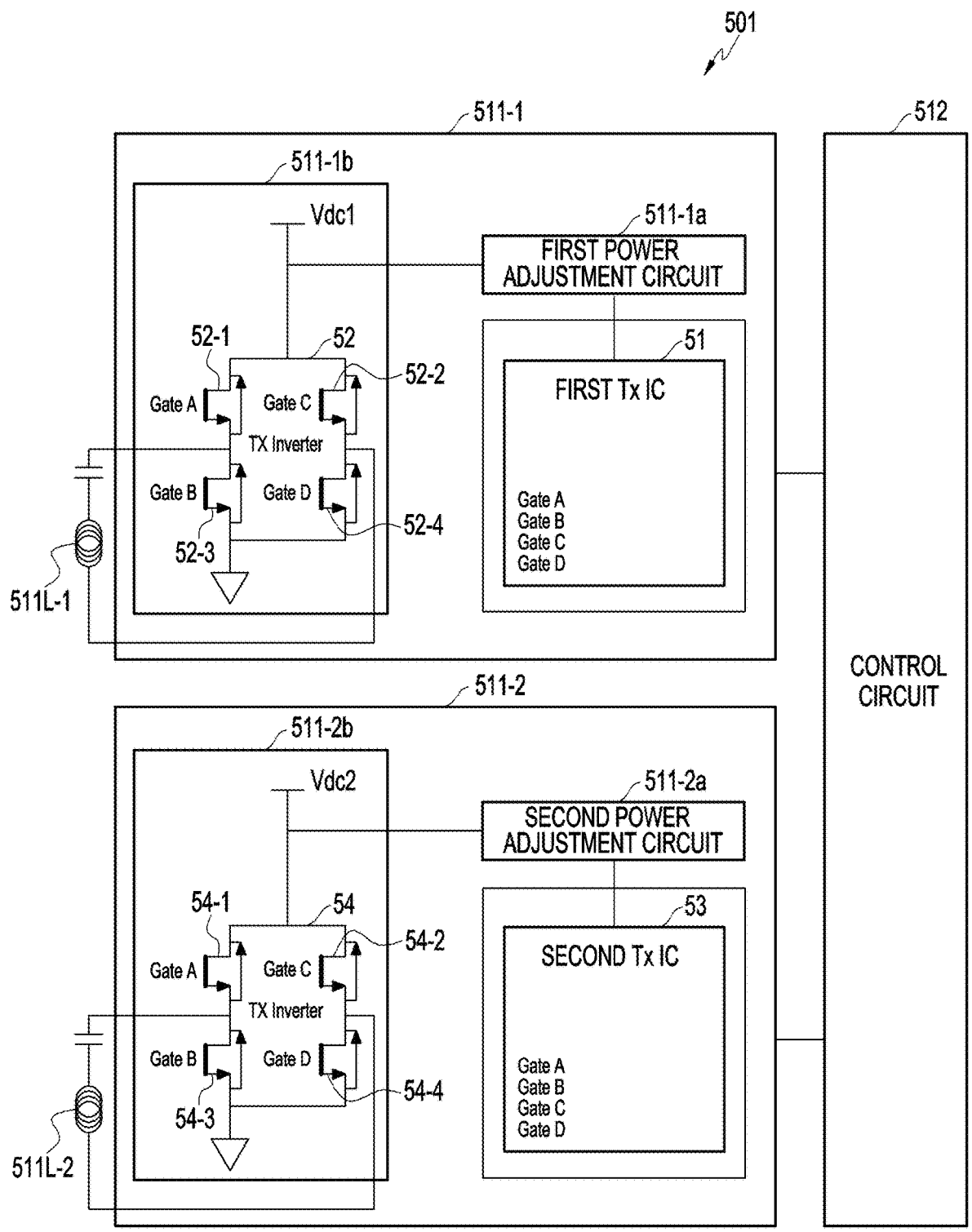
FIG. 5 is a diagram illustrating an example of a circuit structure of an electronic device capable of transmitting power to a plurality of external electronic devices according to various embodiments.

FIG. 5 is a diagram illustrating an example of a circuit structure of an electronic device capable of transmitting power to a plurality of external electronic devices according to various embodiments.

Referring to FIG. 5, an electronic device 501 (e.g., an electronic device 102 in FIG. 1, a power transmission device 301 in FIG. 3, or a power transmission device 401 in FIG. 4) (hereinafter, also referred to as 'an electronic device') according to various embodiments may include a plurality of coils 511L (e.g., a transmission coil 311L in FIG. 3 or a plurality of coils 411L in FIG. 4), a first power transmission circuit 511-1 (e.g., a power transmission circuit 311 in FIG. 3 or a first power transmission circuit 411-1 in FIG. 4), a second power transmission circuit 511-2 (e.g., the power transmission circuit 311 in FIG. 3 or a second power transmission circuit 411-2 in FIG. 4), and/or a control circuit 512 (e.g., a control circuit 312 in FIG. 3 or a control circuit 412 in FIG. 4).

According to various embodiments, the plurality of coils 511L may include a first transmission coil 511L-1 and a second transmission coil 511L-2. According to an embodiment, the plurality of coils 511L may further include an additional transmission coil (e.g., an Nth transmission coil 411L-N) in addition to the first transmission coil 511L-1 and the second transmission coil 511L-1.

According to various embodiments, the first power transmission circuit 511-1 may include a first power adjustment circuit 511-1a, a first power generation circuit 511-1b, and/or a first TxIC 51.

According to various embodiments, the first Tx IC 51 may control the first power adjustment circuit 511-1a and the first power generation circuit 511-1b. The first power adjustment circuit 511-1a may provide the first power generation circuit 511-1b with a first voltage (power source or power). According to an embodiment, the first power adjustment circuit 511-1a may be connected to the first Tx IC (transmit integrated circuit) 51, and vary a first voltage Vdc1 provided to a first inverter (Tx inverter) 52 of the first power generation circuit 511-1b based on a control signal from the first Tx IC (transmit integrated circuit) 51. According to an embodiment, the first power adjustment circuit 511-1a may be included in the first Tx IC (transmit integrated circuit) 51, and the first Tx IC (transmit integrated circuit) 51 may vary the first voltage Vdc1 provided to the first inverter (Tx inverter) 52 of the first power generation circuit 511-1b.

According to various embodiments, the first power generation circuit 511-1b may include the first inverter (Tx inverter) 52. The first inverter (Tx inverter) 52 may generate a first signal of a first frequency (e.g., 110 kHz) for providing first power by using the first voltage (Vdc1) provided by the Tx IC (transmit integrated circuit) 51. According to an embodiment, the first inverter (Tx inverter) 52 may include a bridge circuit including a plurality of field effect transistors (FETs) 52-1 to 52-4. The first inverter (Tx inverter) 52 may generate the first signal of the first frequency according to a signal provided to a gate of each of the plurality of field effect transistors (FETs) 52-1 to 52-4.

According to various embodiments, the first signal generated from the first power generation circuit 511-1b may be radiated in a form of an electromagnetic wave via the first transmission coil 511L-1.

According to various embodiments, the second power transmission circuit 511-2 may include a second power adjustment circuit 511-2a, a second power generation circuit 511-2b, and/or a second TxIC 53.

According to various embodiments, the second power adjustment circuit 511-2a may provide the second power generation circuit 511-2b with a second voltage (power source or power). According to an embodiment, the second power adjustment circuit 511-2a may vary a second voltage Vdc2 provided to a second inverter (Tx inverter) 54 of the second power generation circuit 511-2b based on a control signal from a Tx IC (transmit integrated circuit) 53. According to an embodiment, the second power adjustment circuit 511-2a may be included in the second Tx IC (transmit integrated circuit) 53, and the second Tx IC (transmit integrated circuit) 53 may vary the second voltage Vdc2 provided to a drain of the second inverter (Tx inverter) 54 of the second power generation circuit 511-2b.

According to various embodiments, the second power generation circuit 511-2b may include the second inverter (Tx inverter) 54. The second inverter (Tx inverter) 54 may generate a second signal of a second frequency (e.g., 120 kHz) for providing second power by using the second voltage (Vdc2) provided by the Tx IC (transmit integrated circuit) 53. According to an embodiment, the second inverter (Tx inverter) 54 may include a bridge circuit including a plurality of field effect transistors (FETs) 54-1 to 54-4. The second inverter (Tx inverter) 54 may generate the second signal of the second frequency according to a signal provided to a gate of each of the plurality of field effect transistors (FETs) 54-1 to 54-4.

According to various embodiments, the second signal generated from the second power generation circuit 511-2b may be radiated in a form of an electromagnetic wave via the second transmission coil 511L-2.

According to various embodiments, a switch (not shown) may be further included between the first power generation circuit 511-1b or the second power generation circuit 511-2b and the plurality of coils 511L, and at least one of the plurality of coils 511L may be connected to the first power generation circuit 511-1b or the second power generation circuit 511-2b via the switch.

According to various embodiments, the control circuit 512 (e.g., the control circuit 312 in FIG. 3, or the control circuit 412 in FIG. 4) may control the first TxIC 51 to generate a first signal of a first frequency for providing a first external electronic device (e.g., the first external electronic device 402-1) with first power, and control the second TxIC 53 to generate a second signal of a second frequency for providing a second external electronic device (e.g., the second external electronic device 402-2) with second power.

According to various embodiments, the control circuit 512 may include the first TxIC 51 and the second TxIC 53. According to an embodiment, if it is required to transmit power to the first external electronic device 402-1 for wireless charging via the first transmission coil 511L-1, the control circuit 512 may control the first TX IC 51 thereby a first voltage (Vdc1) may be provided to the first inverter 52, and the control circuit 512 may control the first TX IC 51 thereby a signal for generating a signal of the first frequency (e.g., 110 kHz) may be provided to gates of FETs of the first inverter 52.

According to an embodiment, if it is required to transmit power to the second external electronic device 402-2 for wireless charging via the second transmission coil 511L-2, a second voltage (Vdc2) may be controlled by the control circuit 512 to be provided to the second inverter 54 via the second TX IC 53, and a signal for generating a signal of the second frequency (e.g., 120 kHz) may be controlled by the control circuit 512 to be provided to gates of FETs of the second inverter 54 via the second TX IC 53.

According to various embodiments, the control circuit 512 may set a frequency of a first signal generated in the first power transmission circuit 511-1 and the second power transmission circuit 511-2 to be a first frequency (e.g., 110 kHz) in a default state (a state in which power is not transmitted).

According to various embodiments, if power transmission is required by each of a plurality of external electronic devices (e.g., the first external electronic device 402-1 and the second external electronic device 402-2) in a state in which a transmission signal frequency of each of the first power transmission circuit 511-1 and the second power transmission circuit 511-2 is set to a first signal of a first frequency (e.g., 110 kHz), the control circuit 512 may set (or change) a frequency of one (e.g., the second power generation circuits 511-2*b*) of the first power generation circuits 511-1*b* or the second power generation circuits 511-2*b* to a second frequency (e.g., 120 kHz) different from the first frequency (e.g., 110 kHz), and set (or change) a voltage provided to the second inverter 54 of the second power generation circuits 511-2*b* to a second voltage (Vdc2). The second voltage (Vdc2) may be a voltage capable of compensating for a difference between first power provided via the first frequency (e.g., 110 kHz) and second power provided by using the second frequency (e.g., 120 kHz).

According to various embodiments, if approach of the second external electronic device 402-2 is sensed while the control circuit 512 provides the first external electronic device 402-1 with first power by using the first signal of a first frequency (e.g., 110 kHz) by using the first power generation circuit 511-1*b*, the control circuit 512 may control to set a frequency of the second power generation circuit 511-2*b* to a second frequency (e.g., 120 kHz) different from the first frequency (e.g., 110 kHz), and to set a voltage provided to the second inverter 54 of the second power generation circuit 511-2*b* to a second voltage (Vdc2) which corresponds to the second frequency. According to an embodiment, the control circuit 512 may receive an approach sensing signal from a sensing means (e.g., a coil, and/or the like) which senses the approach of the second external electronic device 402-2. For example, the approach sensing signal may be a Ping response signal received in the coil.

According to various embodiments, if approach of the second external electronic device 402-2 is sensed while the control circuit 512 provides the first external electronic device 402-1 with first power by using a first signal of a first frequency (e.g., 110 kHz) by using the second power generation circuit 511-2*b*, the control circuit 512 may control to set a frequency of the first power generation circuit 511-1*b* to a second frequency (e.g., 120 kHz) different from the first frequency (e.g., 110 kHz), and to set a voltage provided to the first inverter 52 of the first power generation circuit 511-1*b* to a second voltage (Vdc2) which corresponds to the second frequency. According to an embodiment, the control circuit 512 may receive an approach sensing signal from a sensing means (e.g., a coil, and/or the like) which senses the approach of the second external electronic device 402-2. For example, the approach sensing signal may be a Ping response signal received in the coil.

According to various embodiments, while providing the first external electronic device 402-1 with the first power by using the first signal of the first frequency (e.g., 110 kHz) and providing the second external electronic device 402-2 with the second power by using the second signal of the second frequency (e.g., 120 kHz), the control circuit 512 may control each of the first frequency (e.g., 110 kHz) and the second frequency (e.g., 120 kHz) to be set (or changed) to another frequency based on charging states of the first external electronic device 402-1 and the second external electronic device 402-2.

For example, if charging power charged in the first external electronic device 402-1 is lower than charging power charged in the second external electronic device 402-2 (for example, if the first external electronic device 402-1 is fully charged and the charging power charged in the first external electronic device 402-1 is lower than the charging power charged in the second external electronic device 402-2) while the control circuit 412 provides the first external electronic device 402-1 with the first power by using the first signal of the first frequency (e.g., 110 kHz) and provides the second external electronic device 402-2 with the second power by using the second signal of the second frequency, the control circuit 512 may change the first frequency (e.g., 110 kHz) and the first voltage (Vdc1) of the first power generation circuit 511-1*b* to another frequency and another voltage, respectively, to provide the external electronic device 402-1 with power less than the first power, and change the second frequency (e.g., 120 kHz) of the second power generation circuit 511-2*b* to a frequency which is different from the changed frequency of the first power generation circuit 511-1*b*. If the second frequency is changed to the different frequency, the second voltage (Vdc2) may be changed to a different voltage for maintaining the second power. For example, the first frequency (e.g., 110 kHz) and the first voltage (Vdc1) of the first signal may be changed to the second frequency (e.g., 120 kHz) and a voltage which is equal to or lower than the first voltage, respectively, and the second frequency (e.g., 120 kHz) and the second voltage (Vdc2) of the second signal may be changed to the first frequency (e.g., 110 kHz) and the first voltage (Vdc1), respectively.

According to various embodiments, an electronic device e.g., an electronic device 102 in FIG. 1, a power transmission device 301 in FIG. 3, a power transmission device 401 in FIG. 4, or an electronic device 501 in FIG. 5) may include a plurality of coils (e.g., 411L in FIG. 4 or 511L in FIG. 5), a first power generation circuit e.g., 411-1*b* in FIG. 4 or 511-1*b* in FIG. 5) electrically connected to at least one of the plurality of coils, a second power generation circuit (e.g., 411-2*b* in FIG. 4 or 511-2*b* in FIG. 5) electrically connected to at least one of the plurality of coils, and a control circuit (e.g., 412 in FIG. 4 or 512 in FIG. 5), and the control circuit may be configured to: when approach of a second external electronic device is detected while first power is provided to a first external electronic device by using the first power generation circuit, set a frequency of the second power generation circuit to a second frequency different front a first frequency for providing the second external electronic device with second power.

According to various embodiments, the control circuit (e.g., 412 in FIG. 4 or 512 in FIG. 5) may be configured to set a first voltage of the second power generation circuit to a second voltage which corresponds to the second frequency.

According to various embodiments, the plurality of coils may include a first coil (e.g., 411L-1 in FIG. 4 or 511L-1 in FIG. 5) and a second coil (e.g., 411L-2 in FIG. 4 or 511L-2 in FIG. 5), the first coil may be electrically connected to the first power generation circuit, and the second coil may be electrically connected to the second power generation circuit.

According to various embodiments, the plurality of coils may include a first coil (e.g., 411L-1 in FIG. 4 or 511L-1 in FIG. 5) and a second coil (e.g., 411L-2 in FIG. 4 or 511L-2 in FIG. 5), and the electronic device may further include a switch configured to connect at least one of the first coil and the second coil to the first power generation circuit, and connect at least one of the first coil and the second coil to the second power generation circuit.

According to various embodiments, the second frequency may be a frequency higher than the first frequency by a designated frequency.

According to various embodiments, the second voltage may be a voltage higher than the first voltage by a designated voltage corresponding to the second frequency.

According to various embodiments, the first power and the second power may have the same magnitude.

According to various embodiments, the control circuit may be configured to control the first frequency to be set to a frequency lower than the second frequency if the first power is greater than the second power.

According to various embodiments, the first power generation circuit may include a first inverter (e.g., 52 in FIG. 5), the second power generation circuit may include a second inverter (e.g., 54 in FIG. 5), and the first inverter and the second inverter may include at least one field effect transistor (FET) (e.g., 52-1~52-4 in FIG. 5).

According to various embodiments, the control circuit may be configured to set a voltage provided to a drain of the at least one field effect transistor (FET) of the second inverter to the second voltage which corresponds to the second frequency.

According to various embodiments, an electronic device an electronic device 102 in FIG. 1, a power transmission device 301 in FIG. 3, a power transmission device 401 in FIG. 4, or an electronic device 501 in FIG. 5) may include a plurality of coils (e.g., 411L in FIG. 4 or 511L in FIG. 5), a first power generation circuit (e.g., 411-1*b* in FIG. 4 or 511-1*b* in FIG. 5) electrically connected to at least one of the plurality of coils, a second power generation circuit (e.g., 411-2*b* in FIG. 4 or 511-2*b* in FIG. 5) electrically connected to at least one of the plurality of coils, and a control circuit (e.g., 412 in FIG. 4 or 512 in FIG. 5), and the control circuit may be configured to: provide a first external electronic device with first power using a first signal of a first frequency via the first power generation circuit, and set the first frequency and a second frequency based on a charging state of each of the first external electronic device and a second external electronic device while providing the second external electronic device with second power using a second signal of the second frequency via the second power generation circuit.

According to various embodiments, the plurality of coils may include a first coil (e.g., 411L-1 in FIG. 4 or 511L-1 in FIG. 5) and a second coil (e.g., 411L-2 in FIG. 4 or 511L-2 in FIG. 5), the first coil may be electrically connected to the first power generation circuit, and the second coil may be electrically connected to the second power generation circuit.

According to various embodiments, the plurality of coils may include a first coil (e.g., 411L-1 in FIG. 4 or 511L-1 in FIG. 5) and a second coil (e.g., 411L-2 in FIG. 4 or 511L-2 in FIG. 5), and the electronic device may further include a switch configured to connect at least one of the first coil and the second coil to the first power generation circuit, and connect at least one of the first coil and the second coil to the second power generation circuit.

According to various embodiments, the control circuit 412 in FIG. 4 or 512 in FIG. 5) may be configured to control to change the first frequency and the second frequency if a charging state of at least one of the first external electronic device and the second external electronic device is a full charging state.

According to various embodiments, the first power and the second power may have the same magnitude.

According to various embodiments, the first power generation circuit may include a first inverter (e.g., 52 in FIG. 5), the second power generation circuit may include a second inverter (e.g., 54 in FIG. 5), and the first inverter and the second inverter may include at least one field effect transistor (FET) (e.g., 52-1~52-4 in FIG. 5).

According to various embodiments, the first frequency and the second frequency may be included in a designated wireless charging frequency band.

According to various embodiments, an electronic device (e.g., an electronic device 102 in FIG. 1, a power transmission device 301 in FIG. 3, a power transmission device 401 in FIG. 4, or an electronic device 501 in FIG. 5) may include a plurality of coils (e.g., 411L in FIG. 4 or 511L in FIG. 5), a first power generation circuit (e.g., 411-1*b* in FIG. 4 or 511-1*b* in FIG. 5) electrically connected to at least one of the plurality of coils, a second power generation circuit (e.g., 411-2*b* in FIG. 4 or 511-2*b* in FIG. 5) electrically connected to at least one of the plurality of coils, and a control circuit (e.g., 412 in FIG. 4 or 512 in FIG. 5), and the control circuit may be configured to: control the first power generation circuit to generate a first signal for providing a first external electronic device with first power, and control the second power generation circuit to generate a second signal for providing a second external electronic device with second power.

According to various embodiments, the control circuit 412 in FIG. 4 or 512 in FIG. 5) may be configured to: when approach of the second external electronic device is detected while the first power is provided to the first external electronic device, set a frequency of the second signal of the second power generation circuit (e.g., 411-2*b* in FIG. 4 or 511-2*b* in FIG. 5) to a second frequency different from a first frequency of the first signal, and set a first voltage provided to the second power generation circuit to a second voltage which corresponds to the second frequency.

According to various embodiments, the control circuit e.g., 412 in FIG. 4 or 512 in FIG. 5 may be configured to: when approach of the second external electronic device is detected while the first power is provided to the first external electronic device, set a frequency of the first signal of the first power generation circuit (e.g., 411-1*b* in FIG. 4 or 511-1*b* in FIG. 5) to a second frequency (or change the frequency of the first signal of the first power generation circuit (e.g., 411-1*b* in FIG. 4 or 511-1*b* in FIG. 5) from the first frequency to the second frequency), and set a frequency of the second signal of the second power generation circuit (e.g., 411-2*b* in FIG. 4 or 511-2*b* in FIG. 5) to the first frequency.

Figure 6A:
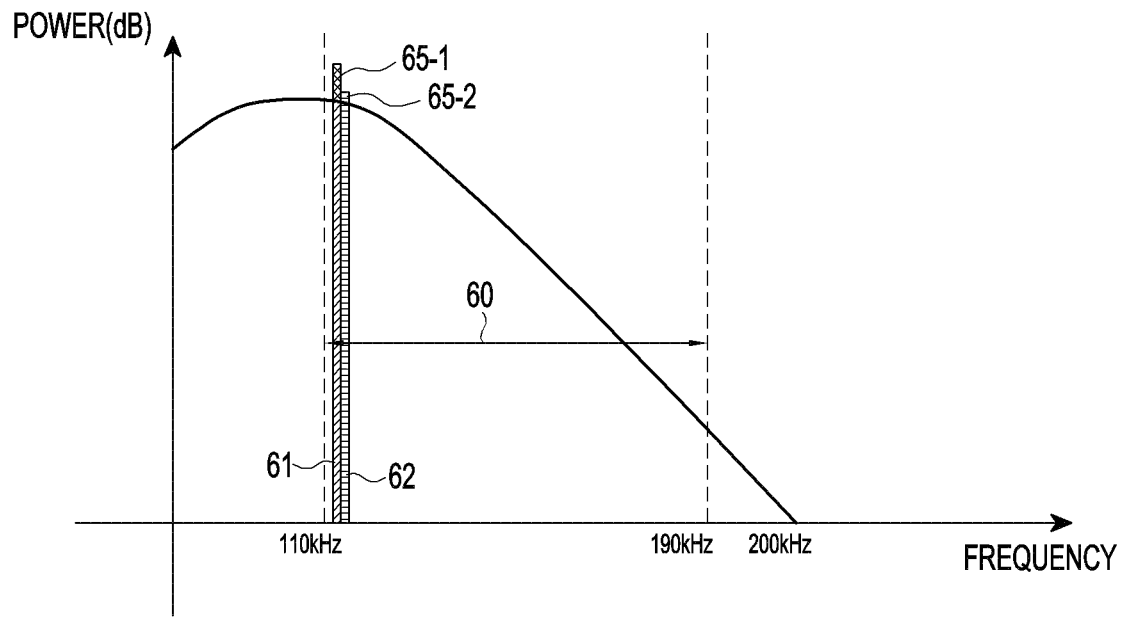
FIGS. 6*a* and 6*b* are graphs illustrating a power relation according to a power transmission frequency in an electronic device according to various embodiments.
Figure 6B:
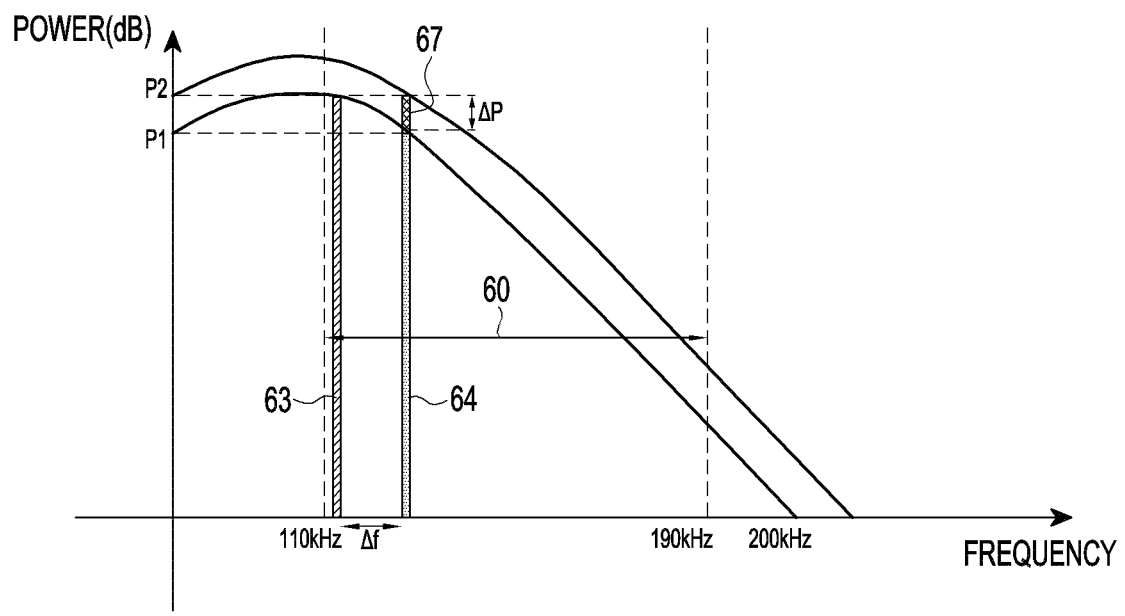

FIGS. 6a and 6b are graphs illustrating a power relation according to a frequency of a wireless power transmission signal in an electronic device according to various embodiments.

Referring to FIGS. 6a and 6b, a horizontal axis may indicate a frequency (f) of a power transmission signal, and a vertical axis may indicate a power level (dB). According to various embodiments, the lower the frequency is, the greater a transmission power magnitude is. According to various embodiments, an electronic device (e.g., an electronic device 102 in FIG. 1, a power transmission device 301 in FIG. 3, a power transmission device 401 in FIG. 4, or a power transmission device 501 in FIG. 5) (hereinafter, the power transmission apparatus 501 in FIG. 5 will be described as an example) may use a designated frequency band 60 to transmit wireless power. According to an embodiment, the designated frequency band may be a wireless charging frequency band, and may be 110 kHz to 190 kHz. According to various embodiments, the designated frequency band may be designated as a different frequency band according to a type of a wireless power reception device, or according to a preset frequency band.

Referring to FIG. 6a, if the electronic device 501 according to various embodiments provides each of a first external electronic device 402-1 and a second external electronic device 402-2 with power by using signals 61 and 62 of the same frequency (e.g., a first frequency (110 kHz)), the signals 61 and 62 of the same frequency (e.g., the first frequency (110 kHz)) interfere (electromagnetic interference: EMI) with each other. Due to this, for example, H-Field Strength, radiated emission (RE), or conducted emission (CE) occurs, so electric field strength of each of wireless power transmission signals increases and a unnecessary signal 65-1 or 65-2 may occur. Due to the occurrence of the H-Field Strength, RE, or CE, a power transmission device and a plurality of wireless power reception devices may fail, and if the signal 65-1 or 65-2 which prevents a designated H-Field, RE, or CE criterion from being satisfied occurs, the electronic device 501 may not be authenticated as a power transmission device. Due to the H-Field Strength, RE, or CE, amount of power transferred from the power transmission device 501 to the first external electronic device 402-1 or the second external electronic device 402-2 becomes lower, so wireless power transmission efficiency may be reduced.

Referring to FIG. 6b, an electronic device 501 may use a first signal of a first frequency (e.g., 110 kHz) 63 to provide a first external electronic device 402-1 with first power, and use a second signal of a second frequency (e.g., 120 kHz) 64 which is different from the first frequency to provide a second external electronic device 402-2 with second power. For example, if it is required to transmit power P2 of the same magnitude to the first external electronic device 402-1 and the second external electronic device 402-2, the electronic device 501 may compensate for difference (ΔP) in power according to difference (Δf) between the first frequency (e.g., 110 kHz) 63 and the second frequency (e.g., 120 kHz) 64.

For example, in a state in which it is required to transmit the power P2 of the same magnitude to the first external electronic device 402-1 and the second external electronic device 402-2, if the electronic device 501 sets a frequency of a first power generation circuit 511-1b to the first frequency (e.g., 110 kHz), and sets a frequency of a second power generation circuit 511-2b to the second frequency (e.g., 120 kHz), the electronic device 501 may cause a voltage provided to a second inverter 54 of the second power generation circuit 511-2b to be set (or changed) from a first voltage Vdc1 to a second voltage Vdc2 for compensating for the difference (ΔP) in transmission power according to difference between the first frequency (e.g., 110 kHz) and the second frequency (e.g., 120 kHz). According to FIG. 6b, the power transmission device 501 may prevent occurrence of the unnecessary signal 65-1 or 65-2 due to, for example, H-Field Strength, radiated emission (RE), or conducted emission (CE) by transmitting power to the first external electronic device 402-1 and the second external electronic device 402-2 by using different frequencies (e.g., the first frequency (e.g., 110 kHz) and the second frequency (e.g., 120 kHz)).

Figure 7:
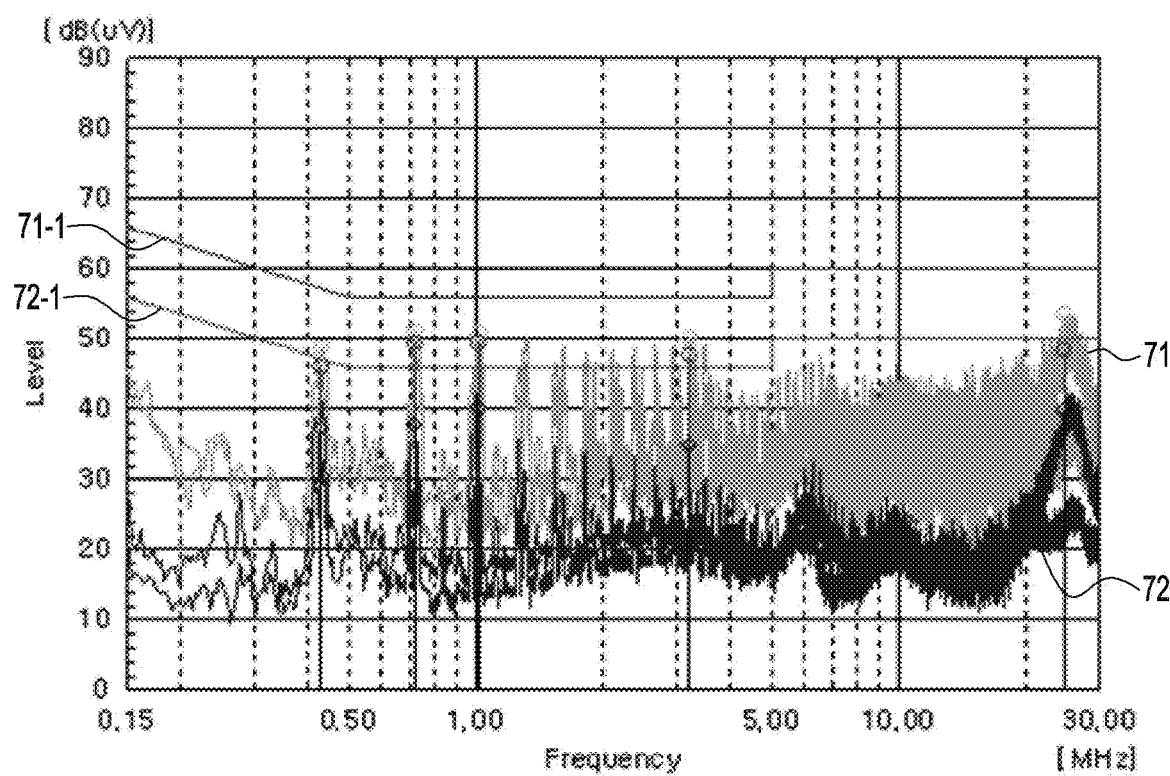
FIG. 7 is a graph illustrating a result of measuring conducted emission (CE) when transmitting power using different frequencies in an electronic device according to various embodiments.

FIG. 7 is a graph illustrating a result of measuring conducted emission (CE) when transmitting power using different frequencies in an electronic device according to various embodiments.

Referring to FIG. 7, a horizontal axis may indicate a frequency of measured conductive emission energy, and a vertical axis may indicate a level (dB) of the measured conductive emission energy. The conducted emission energy may be unnecessary electromagnetic energy occurred in an electronic device 501.

For example, if the electronic device 501 provides a first external electronic device 402-1 and a second external electronic device 402-2 with first power and second power, respectively, by using different first and second frequencies, a result of measuring conducted emission energy may appear as a conducted emission peak spectrum 71 and a conducted emission average spectrum 72. In other words, the conductive emission peak spectrum 71 may not exceed a designated peak limit 71-1, and the conductive emission average spectrum 72 may not exceed a designated average limit 72-1. For example, the designated peak limit 71-1 and the designated average limit 72-1 may be criteria for identifying whether EMI occurs due to conducted emission, and may be preset limits. So, if the electronic device 501 provides the first external electronic device 402-1 and the second external electronic device 402-2 with the first power and the second power, respectively, by using the different first and second frequencies and an inputted voltage (e.g., 230V), a result in which a degree of conductive emission is lower than the designated limit may indicate that occurrence of EMI may be prevented.

Figure 8:
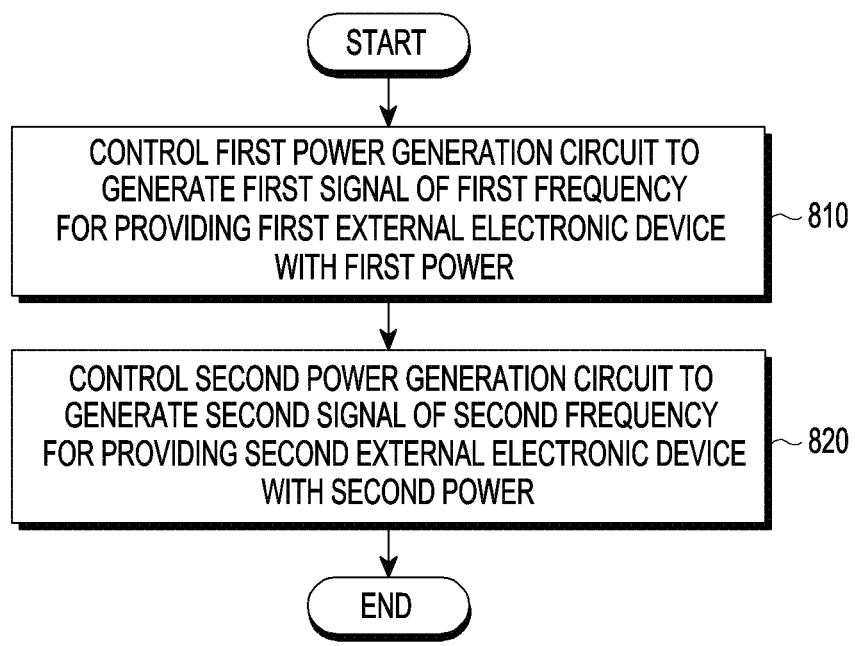
FIG. 8 is a flowchart illustrating a multi-wireless transmission power control method in an electronic device according to various embodiments.

FIG. 8 is a flowchart illustrating a multi-wireless transmission power control method in an electronic device according to various embodiments.

Operations 810 and 820 according to various embodiments may be understood as an operation performed in an electronic device (e.g., an electronic device 102 in FIG. 1, a power transmission device 301 in FIG. 3, a power transmission device 401 in FIG. 4, or a power transmission device 501 in FIG. 5), or a control circuit (e.g., a control circuit 312 in FIG. 3, a control circuit 412 in FIG. 4, or a control circuit 512 in FIG. 5, hereinafter, the control circuit 512 in FIG. 5 will be described as an example) of the electronic device.

Referring to FIG. 8, in operation 810, the control circuit 512 may perform an operation of controlling a first power generation circuit (e.g., a power generation circuit 311b in FIG. 3, a first power generation circuit 411-1b in FIG. 4, or a first power generation circuit 511-1b in FIG. 5) to generate a first signal of a first frequency (e.g., 110 kHz) for providing a first external electronic device (e.g., a first external electronic device 402-1 in FIG. 4) with first power. For example, if it is required to transmit power to the first external electronic device 402-1 for wireless charging via a first transmission coil 511L-1, the control circuit 512 may control a first power adjustment circuit 511-1a to provide the first power generation circuit 511-1b with a first voltage (Vdc1), control the first power generation circuit 511-1b to generate a first signal of the first frequency (e.g., 110 kHz), and control the generated first signal of the first frequency to be transferred to the first external electronic device 402-1 via the first transmission coil 511L-1.

In operation 820, the control circuit 512 may control a second power generation circuit (e.g., the power generation circuit 311b of FIG. 3, a second power generation circuit 411-2b in FIG. 4, or a second power generation circuit 511-2b in FIG. 5) to generate a second signal of a second frequency (e.g., 120 kHz) for providing a second external electronic device (e.g., a second external electronic device 402-2 in FIG. 4) with second power. For example, if it is required to transmit power to the second external electronic device 402-2 for wireless charging via a second transmission coil 511L-2, the control circuit 512 may control a second power adjustment circuit 511-2a to provide the second power generation circuit 511-2b with a second voltage (Vdc2), control the second power generation circuit 511-2b to generate a second signal of the second frequency (e.g., 120 kHz), and control the generated second signal of the second frequency to be transferred to the second external electronic device 402-2 via the second transmission coil 511L-2.

According to various embodiments, a multi-wireless transmission power control method in the electronic device (e.g., the electronic device 102 in FIG. 1, the power transmission device 301 in FIG. 3, the electronic device 401 in FIG. 4, or the electronic device 501 in FIG. 5) may include an operation of controlling the first power generation circuit (e.g., the power generation circuit 311b in FIG. 3, the first power generation circuit 411-1b in FIG. 4, or the first power generation circuit 511-1b in FIG. 5) to generate the first signal of the first frequency for providing the first external electronic device (e.g., the first external electronic device 402-1 in FIG. 4) with the first power, and an operation of controlling the second power generation circuit (e.g., the power generation circuit 311b in FIG. 3, the second power generation circuit 411-2b in FIG. 4, or the second power generation circuit 511-2b in FIG. 5) to generate the second signal of the second frequency for providing the second external electronic device (e.g., the second external electronic device 402-2 in FIG. 4) with the second power.

According to various embodiments, the first power and the second power may have the same magnitude.

According to various embodiments, the control circuit 512 may further include an operation of sensing approach of the second external electronic device while providing the first external electronic device with the first power, and an operation of setting a frequency of the second power generation circuit to the second frequency different from the first frequency when the approach is sensed, and setting the first voltage provided to the second power generation circuit to a second voltage which corresponds to the set second frequency.

According to various embodiments, the second frequency may be a frequency which is higher than the first frequency by a designated frequency, and the second voltage may be a voltage which is higher than the first voltage by a designated voltage corresponding to the second frequency.

According to various embodiments, the control circuit may further include an operation of identifying charging states of the first external electronic device and the second external electronic device while providing the first external electronic device with the first power and providing the second external electronic device with the second power, and an operation of changing the first frequency of the first power generation circuit and the second frequency of the second power generation circuit based on the charging states of the first external electronic device and the second external electronic device.

According to various embodiments, if the first power is greater than the second power, the first external electronic device may set the first frequency to a frequency which is lower than the second frequency.

According to various embodiments, when the first voltage provided to the second power generation circuit is set to the second voltage which corresponds to the set second frequency, the first voltage provided to a drain of at least one field effect transistor (FET) of a second inverter included in the second power generation circuit may be set to the second voltage which corresponds to the second frequency.

According to various embodiments, the first frequency and the second frequency may be frequencies included in a designated wireless charging frequency band.

Figure 9A:
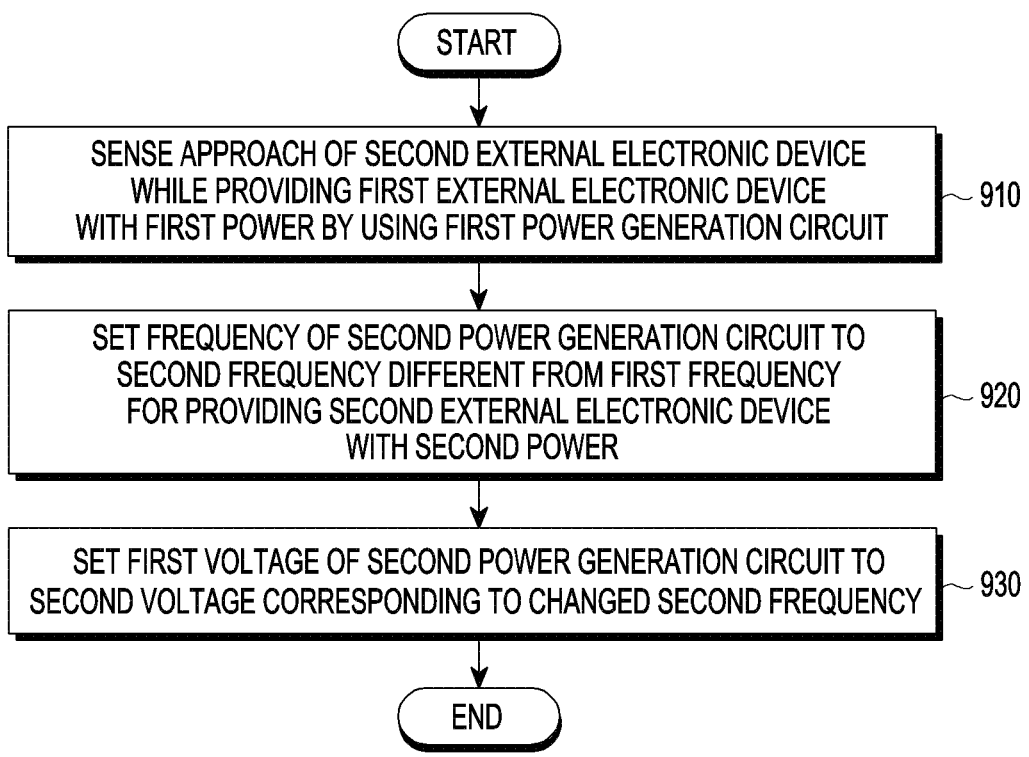
FIGS. 9*a* and 9*b* are flowcharts illustrating a multi-wireless transmission power control method when a second external electronic device approaches an electronic device while the electronic device provides a first external electronic device with first power in the electronic device according to various embodiments.
Figure 9B:
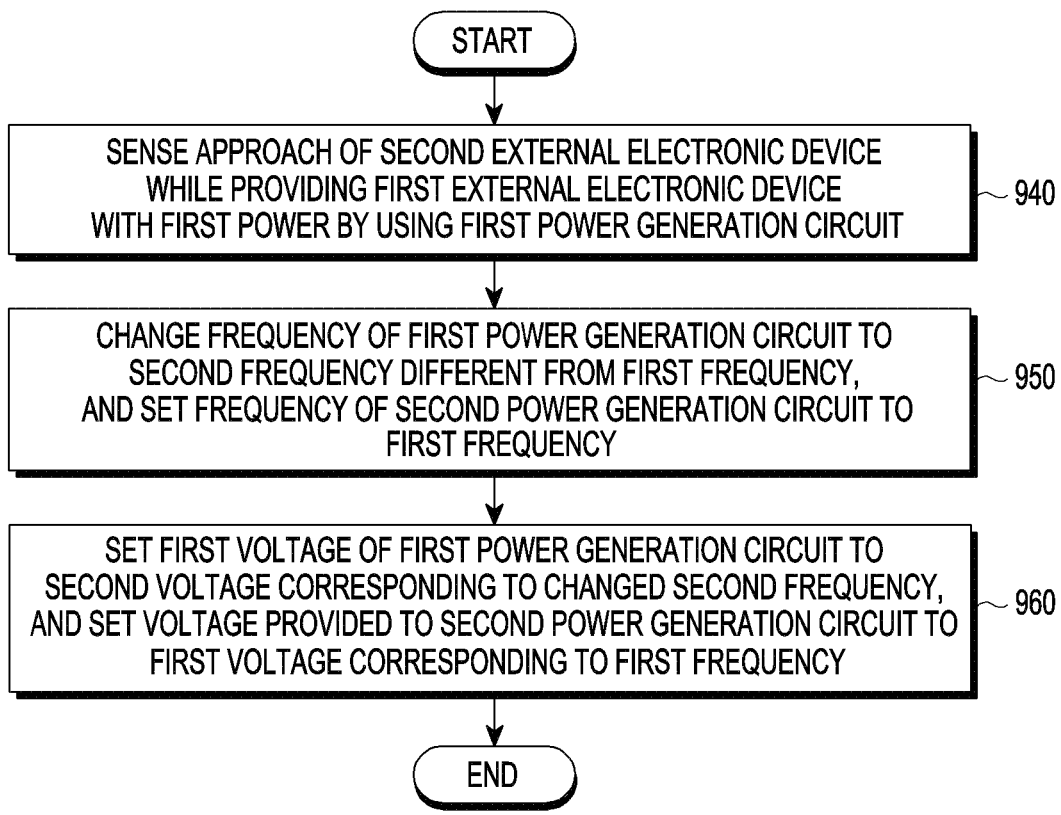

FIGS. 9a and 9b are flowcharts illustrating a multi-wireless transmission power control method when a second external electronic device approaches an electronic device while the electronic device provides a first external electronic device with first power in the electronic device according to various embodiments.

Referring to FIG. 9a, operations 910 to 930 according to various embodiments may be understood as an operation performed in an electronic device (e.g., an electronic device 102 in FIG. 1, a power transmission device 301 in FIG. 3, a power transmission device 401 in FIG. 4, or a power transmission device 501 in FIG. 5), or a control circuit (e.g., a control circuit 312 in FIG. 3, a control circuit 412 in FIG. 4, or a control circuit 512 in FIG. 5, hereinafter, the control circuit 512 in FIG. 5 will be described as an example) of the electronic device.

In operation 910, the control circuit 512 may sense approach of a second external electronic device 402-2 while providing a first external electronic device 402-1 with first power by using a first signal of a first frequency (e.g., 110 kHz) by using a first power generation circuit 511-1b. According to an embodiment, the control circuit 512 may receive an approach sensing signal from a sensing means (e.g., a coil, and/or the like) which senses the approach of the second external electronic device 402-2. For example, the approach sensing signal may be a Ping response signal received in the coil.

In operation 920, if the approach of the second external electronic device 402-2 is sensed, the control circuit 512 may set a frequency of a second power generation circuit 511-2b to a second frequency (e.g., 120 kHz) different from the first frequency (e.g., 110 kHz).

In operation 930, the control circuit 512 may set a voltage provided to the second power generation circuit 511-2b to a second voltage (Vdc2) which corresponds to the second frequency. For example, the control circuit 512 may set the voltage provided to the second power generation circuit 511-2b to the second voltage (Vdc2) for compensating for power according to a difference between the first frequency (e.g., 110 kHz) and the second frequency (e.g., 120 kHz).

Referring to FIG. 9b, operations 940 to 960 according to various embodiments may be understood as an operation performed in an electronic device (e.g., an electronic device 102 in FIG. 1, a power transmission device 301 in FIG. 3, a power transmission device 401 in FIG. 4, or a power transmission device 501 in FIG. 5), or a control circuit (e.g., a control circuit 312 in FIG. 3, a control circuit 412 in FIG.

4, or a control circuit 512 in FIG. 5, hereinafter, the control circuit 512 in FIG. 5 will be described as an example) of the electronic device.

In operation 940, the control circuit 512 may sense approach of a second external electronic device 402-2 while providing a first external electronic device 402-1 with first power by using a first signal of a first frequency (e.g., 110 kHz) by using a first power generation circuit 511-1b. According to an embodiment, the control circuit 512 may receive an approach sensing signal from a sensing means (e.g., a coil, and/or the like) which senses the approach of the second external electronic device 402-2. For example, the approach sensing signal may be a Ping response signal received in the coil.

In operation 950, if the approach of the second external electronic device 402-2 is sensed, the control circuit 512 may change a frequency of a first power generation circuit 511-1b to a second frequency (e.g., 120 kHz) different from a first frequency (e.g., 110 kHz), and set a frequency of a second power generation circuit 511-2b to the first frequency (e.g., 110 kHz). According to an embodiment, if the second external electronic device 402-2 needs rapid charging, the control circuit 512 may change the frequency of the first power generation circuit 511-1b to the second frequency (e.g., 120 kHz) which is higher than the first frequency (e.g., 110 kHz), and change the frequency of the second power generation circuit 511-2b to the first frequency (e.g., 110 kHz) which is lower than the second frequency (e.g., 120 kHz).

In operation 960, the control circuit 512 may set a voltage provided to the first power generation circuit 511-1b to a second voltage (Vdc2) which corresponds to the second frequency, and may set a voltage provided to the second power generation circuit 511-2b to a first voltage (Vdc1) which corresponds to the first frequency.

Figure 10:
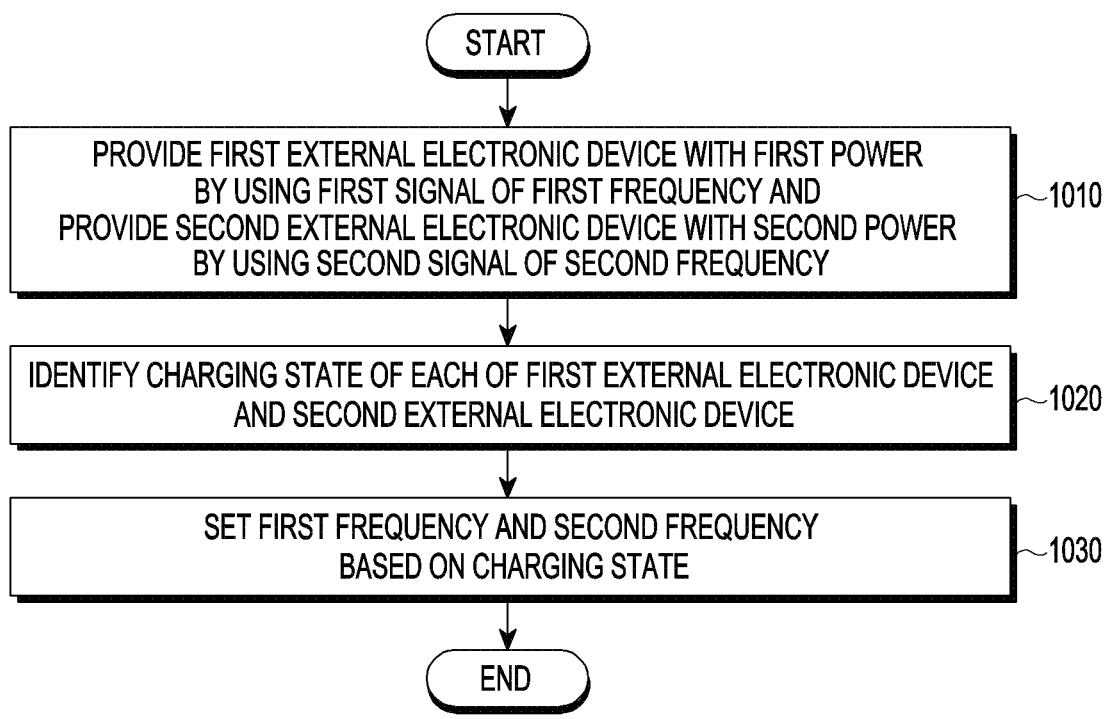
FIG. 10 is a flowchart illustrating a multi-wireless transmission power control method according to charging states of external electronic devices in an electronic device according to various embodiments.

FIG. 10 is a flowchart illustrating a multi-wireless transmission power control method according to charging states of external electronic devices in an electronic device according to various embodiments.

Operations 1010 to 1030 according to various embodiments may be understood as an operation performed in an electronic device (e.g., an electronic device 102 in FIG. 1, a power transmission device 301 in FIG. 3, a power transmission device 401 in FIG. 4, or a power transmission device 501 in FIG. 5), or a control circuit (e.g., a control circuit 312 in FIG. 3, a control circuit 412 in FIG. 4, or a control circuit 512 in FIG. 5, hereinafter, the control circuit 512 in FIG. 5 will be described as an example) of the electronic device.

Referring to FIG. 10, in operation 1010, the control circuit 512 may control to provide a first external electronic device 402-1 with first power by using a first signal of a first frequency (e.g., 110 kHz) and provide a second external electronic device 402-2 with second power by using a second signal of a second frequency.

In operation 1020, the control circuit 512 may identify charging states of the first external electronic device 402-1 and the second external electronic device 402-2 while providing the first external electronic device 402-1 with the first power by using the first signal of the first frequency (e.g., 110 kHz) and providing the second external electronic device 402-2 with the second power by using the second signal of the second frequency. For example, the control circuit 512 may identify whether a battery of each of the first external electronic device 402-1 and the second external electronic device 402-2 is in a full charging state, or may identify a remaining charge of the battery of each of the first external electronic device 402-1 and the second external electronic device 402-2, and/or the like.

In operation 1030, the control circuit 512 may control to change each of the first frequency (e.g., 110 kHz) of the first signal provided to the first external electronic device (420-1) and the second frequency of the second signal provided to the second external electronic device 402-2 based on the charging states of the first external electronic device 402-1 and the second external electronic device 402-2. For example, if charging power charged in the first external electronic device 402-1 is lower than charging power charged in the second external electronic device 402-2 (for example, if the first external electronic device 402-1 is fully charged and the charging power charged in the first external electronic device 402-1 is lower than the charging power charged in the second external electronic device 402-2), the control circuit 512 may change the first frequency (e.g., 110 kHz) and a first voltage (Vdc1) of the first signal to another frequency and another voltage, respectively, to provide the external electronic device 402-1 with power less than the first power, and change the second frequency (e.g., 120 kHz) and a second voltage (Vdc2) of the second signal to another frequency and another voltage, respectively, to provide the second external electronic device 402-2 with power greater than the second power. According to an embodiment, a changed frequency of the first signal and a changed frequency of the second signal may be different from each other.

For example, the control circuit 512 may control to set (or change) the first frequency (e.g., 110 kHz) of the first power generation circuit 511-1b to a frequency (e.g., the second frequency (e.g., 120 kHz)) which is higher than the first frequency (e.g., 110 kHz) by a designated frequency, and control to set (or change) the first voltage (Vdc1) provided to the first power generation circuit 511-1b to a voltage (e.g., the second voltage (Vdc2)) which is equal to or lower than the first voltage (Vdc1). Further, the control circuit 512 may control to set (or change) the second frequency (e.g., 120 kHz) of the second power generation circuit 511-2b to a frequency (e.g., the first frequency (e.g., 110 kHz)) which is lower than the second frequency (e.g., 120 kHz) by a designated frequency, and control to set (or change) the second voltage (Vdc2) provided to the second power generation circuit 511-2b to the first voltage (Vdc1) for compensating for power which corresponds to the set (or changed) frequency.

Figure 11:
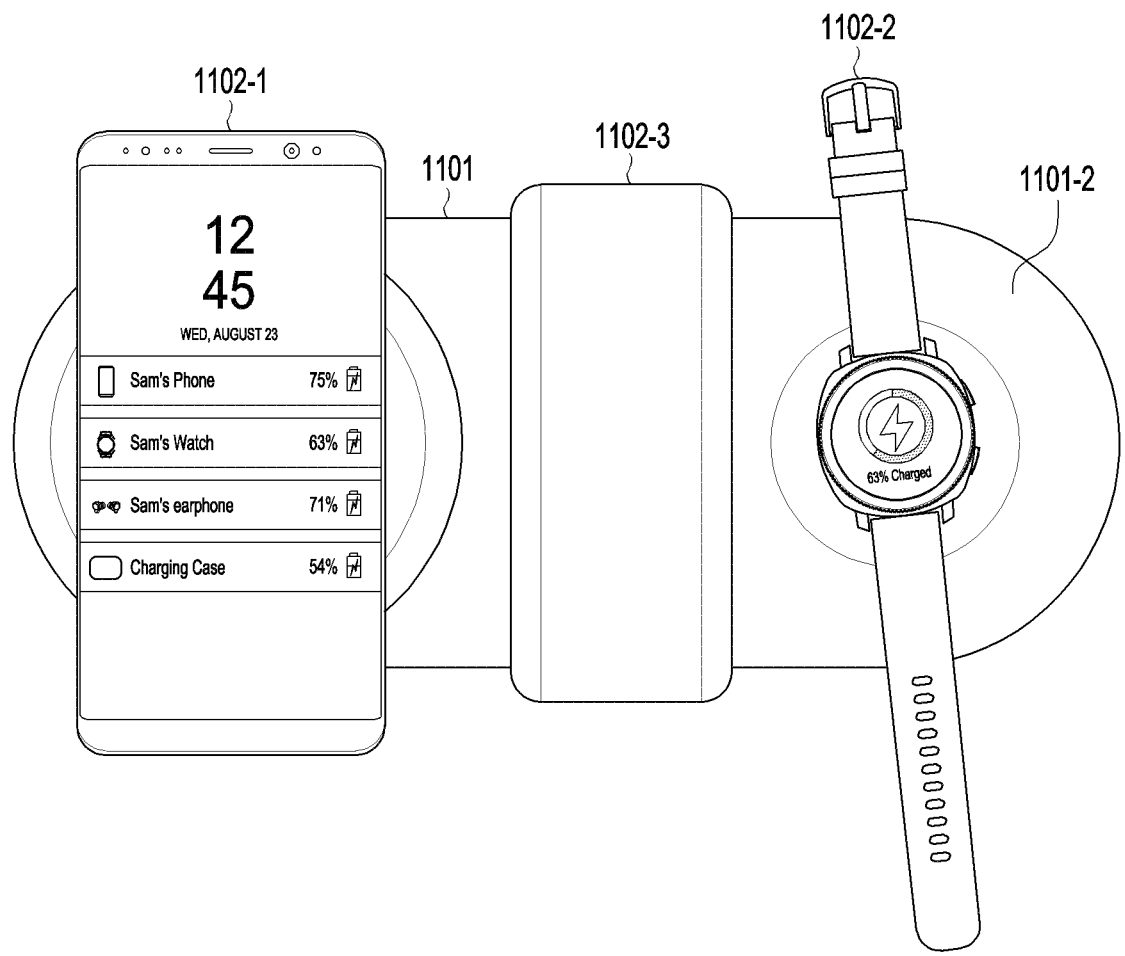
FIGS. 11 and 12 are diagrams illustrating an electronic device and a plurality of external electronic devices according to various embodiments.
Figure 12:
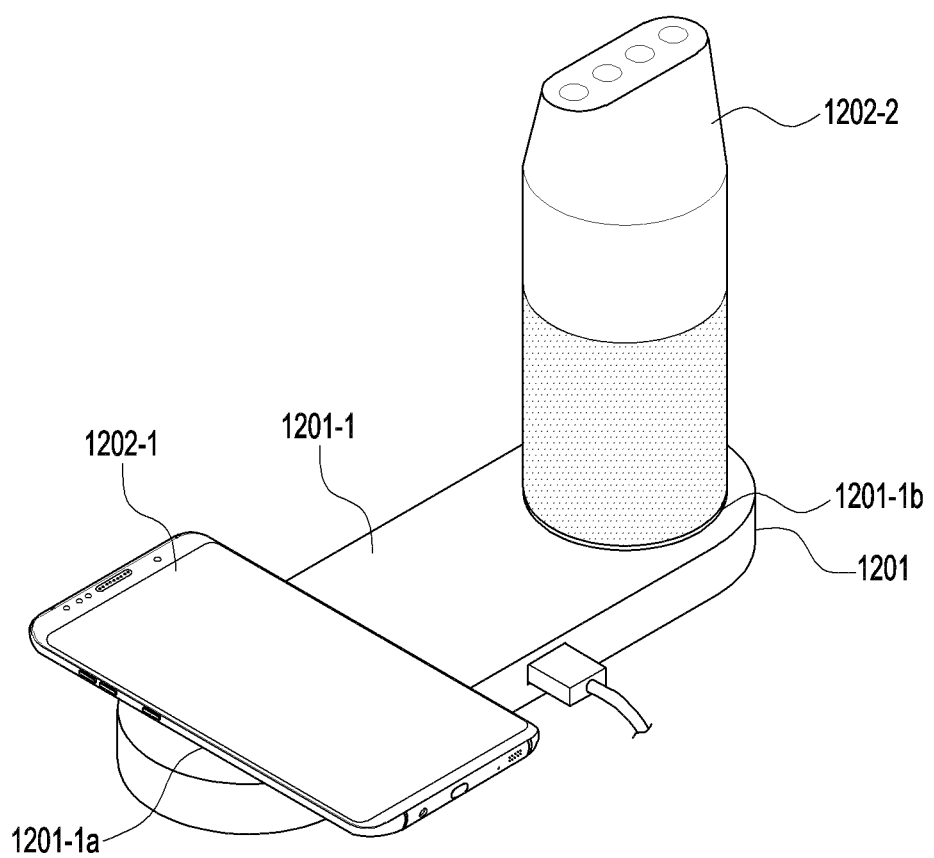

FIGS. 11 and 12 are diagrams illustrating an electronic device and a plurality of external electronic devices according to various embodiments.

Referring to FIG. 11, an electronic device 1101 (e.g., an electronic device 102 in FIG. 1, a power transmission device 301 in FIG. 3, a power transmission device 401 in FIG. 4, or a power transmission device 501 in FIG. 5) according to various embodiments may be a wireless charging pad on which a plurality of external electronic devices 1102-1 to 1102-3, e.g., three or more external electronic devices may be placed. The wireless charging pad 1101 may include a housing 1101-2 in which a portion on which the plurality of external electronic devices 1102-1 to 1102-3 are mounted or placed is not identified or distinguished. The plurality of external electronic devices 1102-1 to 1102-3 may include a smart phone 1102-1, a smart watch 1102-2, or a wireless charging battery pack 1102-3. For example, the electronic device 1101 may wiredly receive power from the external, wirelessly provide the smart phone 1102-1 with first power by using a first signal of a first frequency, and wirelessly provide the smart watch 1102-2 with second power by using a second signal of a second frequency. The electronic device 1101 may wiredly receive power from the external and wirelessly provide the wireless charging battery pack 1102-3 with third power by using a third signal of a third frequency.

Referring to FIG. 12, an electronic device 1201 (e.g., an electronic device 102 in FIG. 1, a power transmission device 301 in FIG. 3, a power transmission device 401 in FIG. 4, or a power transmission device 501 in FIG. 5) according to various embodiments may be a wireless charging pad on which a first external electronic device 1202-1 and a second external electronic device 1202-2 may be placed. The wireless charging pad 1201 may include a housing 1201-1 including a first portion 1201-1a on which the first external electronic device 1202-1 is mounted or placed and a second portion 1201-1b on which the second external electronic device 1202-2 is mounted or placed. For example, if a smart phone 1202-1 is mounted or placed on the first portion 1201-1a, the electronic device 1201 may wiredly receive power from the external, wirelessly provide the smart phone 1202-1 with first power by using a first signal of a first frequency, and if a wireless speaker 1202-2 is mounted or placed on the second portion 1201-1b, the electronic device 1201 may wirelessly provide the wireless speaker 1202-2 with second power by using a second signal of a second frequency.

FIGS. 13a to 13c are diagrams illustrating an example in which a plurality of external electronic devices are mounted or placed on an electronic device according to various embodiments.

Referring to FIGS. 13a to 13c, an electronic device 1301 (e.g., an electronic device 102 in FIG. 1, a power transmission device 301 in FIG. 3, a power transmission device 401 in FIG. 4, or a power transmission device 501 in FIG. 5) according to various embodiments may include a housing 1301-1 in which a first portion 1301-1a on which a first external electronic device 1302-1 is mounted or placed and a second portion 1301-1b on which a second external electronic device 1302-2 is mounted or placed are arranged to face different angles. According to various embodiments, the first portion 1301-1a may be a charging portion dedicated for a first type-external electronic device (e.g., the smart phone 1302-1), and the second portion 1301-1b may be a portion capable of charging an external electronic device (e.g., the smart phone 1302-1, the smart watch 1302-2, or the wireless speaker 1302-3) which may be wirelessly charged without type limitation.

For example, if the smart phone 1302-1 is mounted or placed on the first portion 1301-1a, the electronic device 1301 may wiredly receive power from the external, wirelessly provide the smart phone 1302-1 with first power by using a first signal of a first frequency, and if the smart phone 1302-1, the smart watch 1302-2, or the wireless speaker 1302-3 is mounted or placed on the second portion 1301-1b, the electronic device 1301 may wirelessly provide the mounted or placed smart phone 1302-1, smart watch 1302-2, or wireless speaker 1302-3 with second power by using a second signal of a second frequency.

Each of elements described in the present document may be configured with one or more components, names of which may vary with a type of an electronic device. In various embodiments, the electronic device may be configured to include at least one of the elements described in the present document, some of which may be omitted or to which other elements may be added. In addition, some of the elements of the electronic device according to various embodiments may be integrated into one entity to perform functions of the corresponding elements in the same manner as before they are integrated.

A term "module" used in the present document may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" may include at least one of an application-specific integrated circuit (ASIC) chip, field-programmable gate arrays (FPGAs), and a programmable-logic device performing certain operations already known or to be developed.

At least a part of a device (e.g., modules or functions thereof) or a method (e.g., operations) according to various embodiments may be implemented with instructions stored in a computer-readable storage medium in a form of a programming module. If the instructions are executed by one or more processors (for example, a processor 120), the one or more processors may perform functions corresponding to the instructions. The computer-readable storage medium may be, for example, a memory 130.

According to various embodiments, in a storage medium having stored therein instructions, the instructions may be configured to, when executed by at least one circuit, cause the at least one circuit to perform at least one operation including controlling a first power generation circuit to generate a first signal for providing a first external electronic device with first power, and controlling a second power generation circuit to generate a second signal for providing a second external electronic device with second power.

A computer readable recording medium may include a hard disk, a floppy disk, or magnetic media (e.g., a magnetic tape, optical media (e.g., compact disc read only memory (CD-ROM) or digital versatile disc (DVD)), magneto-optical media (e.g., floptical disk), a hardware device (e.g., ROM, RAM, flash memory, etc.)), and so forth. Further, program instructions may include a machine language code created by a compiler and a high-level language code executable by a computer by using an interpreter, and/or the like. The foregoing hardware device may be configured to be operated as at least one software module to perform an operation in various embodiments, or vice versa.

Modules or programming modules according to various embodiments may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

An electronic device in various embodiments of the present invention described above is not limited to the above-described embodiments and drawings, and it will be understood by those skilled in the art that various substitutions, modifications, and changes are possible within a technical scope of the present invention.

What is claimed is:

1. An electronic device, comprising:
   a plurality of coils;
   a first power generation circuit electrically connected to at least one of the plurality of coils;
   a second power generation circuit electrically connected to at least one of the plurality of coils; and
   a control circuit,
   wherein the control circuit is configured to:
   when approach of a second external electronic device is detected by using at least part of the plurality of coils while first power is provided to a first external electronic device by using a first frequency via the first power generation circuit, for providing the second external electronic device with second power, set a frequency of the second power generation circuit to a second frequency different from the first frequency and set a first voltage of the second power generation circuit to a second voltage which corresponds to the second frequency,
   wherein the second voltage is a voltage capable of compensating for a difference between power provided by using the first frequency of the first power generation circuit and power provided by using the second frequency of the second power generation circuit.

2. The electronic device of claim 1, wherein the plurality of coils include a first coil and a second coil, and
   wherein the first coil is electrically connected to the first power generation circuit, and the second coil is electrically connected to the second power generation circuit.

3. The electronic device of claim 1, wherein the second frequency is a frequency higher than the first frequency by a designated frequency.

4. The electronic device of claim 1, wherein the second voltage is a voltage higher than the first voltage by a designated voltage corresponding to the second frequency.

5. The electronic device of claim 3, wherein the first power and the second power have a same magnitude.

6. The electronic device of claim 1, wherein the control circuit is configured to change the first frequency to a frequency lower than the second frequency if the first power is greater than the second power.

7. The electronic device claim 1, wherein the first power generation circuit includes a first inverter,
   wherein the second power generation circuit includes a second inverter, and
   wherein the first inverter and the second inverter include at least one field effect transistor (FET).

8. The electronic device of claim 7, wherein the control circuit is configured to change a voltage provided to a drain of the at least one field effect transistor (FET) of the second inverter to a second voltage which corresponds to the second frequency.

9. The electronic device of claim 1, wherein the control circuit is configured to control to change the first frequency and the second frequency to a third frequency and a fourth frequency when a charging state of at least one of the first external electronic device and the second external electronic device is a full charging state.

* * * * *